US012785456B2

(12) United States Patent
Wang et al.

(10) Patent No.: US 12,785,456 B2
(45) Date of Patent: Nov. 3, 2026

(54) OBJECT DETECTION FOR WIRELESS POWER TRANSFER

(71) Applicant: Apple Inc., Cupertino, CA (US)

(72) Inventors: Hanwei Wang, Urbana, IL (US); Giuseppe Pinto, San Francisco, CA (US); Ruiyang Lin, Milpitas, CA (US); Tao Li, San Jose, CA (US); Srinivasa V Thirumalai Ananthan Pillai, Santa Clara, CA (US); Jukka-pekka J Sjoeroos, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/612,892

(22) Filed: Mar. 21, 2024

(65) Prior Publication Data

US 2025/0088039 A1 Mar. 13, 2025

Related U.S. Application Data

(60) Provisional application No. 63/605,047, filed on Dec. 1, 2023, provisional application No. 63/581,318, filed on Sep. 8, 2023.

(51) Int. Cl.

| | |
|---|---|
| ***H02J 50/60*** | (2016.01) |
| ***H02J 50/12*** | (2016.01) |
| ***H02J 50/80*** | (2016.01) |

(52) U.S. Cl.

CPC .............. *H02J 50/60* (2016.02); *H02J 50/12* (2016.02); *H02J 50/80* (2016.02)

(58) Field of Classification Search

None

See application file for complete search history.

(56) References Cited

U.S. PATENT DOCUMENTS 8,620,484 B2 12/2013 Baarman
9,106,083 B2 8/2015 Partovi
(Continued)

FOREIGN PATENT DOCUMENTS

CN 111279581 A 6/2020
CN 114709943 7/2022
(Continued)

OTHER PUBLICATIONS

Combined Search and Examination Report for United Kingdom Patent Application GB2413132.8 dated Feb. 11, 2025; 6 pgs.
(Continued)

*Primary Examiner* — Daniel Kessie
(74) *Attorney, Agent, or Firm* — FLETCHER YODER PC

(57) ABSTRACT

A wireless power transmitter (WPT) can include WPT circuitry having a wireless WPT coil that transmits wireless power signals; and control circuitry coupled to the WPT circuitry that: measures a present value of a first function of quality factor and resonant frequency of the wireless power transmitting coil and a present value of a second function of quality factor and resonant frequency of the WPT coil while the WPT is coupled to a wireless power receiver; determines a change between the measured present values and corresponding baseline values of the first and second functions of quality factor and resonant frequency of the WPT coil; determines whether a foreign object is present responsive to the change between the measured present values and corresponding baseline values of the first and second functions of quality factor and resonant frequency exceeding a threshold in a magnetic state space.

23 Claims, 20 Drawing Sheets

(56) References Cited

U.S. PATENT DOCUMENTS

| | | | | |
|---|---|---|---|---|
| 9,294,153 | B2 | 3/2016 | Muratov | |
| 9,410,823 | B2 | 8/2016 | Widmer et al. | |
| 9,450,648 | B2 | 9/2016 | Bastami | |
| 9,505,315 | B2 | 11/2016 | Garcia Briz | |
| 9,530,558 | B2 | 12/2016 | Nakano et al. | |
| 9,929,601 | B2 | 3/2018 | White, II et al. | |
| 9,997,929 | B2 | 6/2018 | Yamamoto et al. | |
| 10,103,584 | B2 | 10/2018 | Van Wageningen | |
| 10,371,848 | B2 | 8/2019 | Roy et al. | |
| 10,530,188 | B2 | 1/2020 | Baarman et al. | |
| 10,530,196 | B2 | 1/2020 | Oettinger et al. | |
| 10,778,048 | B2 | 9/2020 | Van Wageningen et al. | |
| 10,879,743 | B2 | 12/2020 | Vocke et al. | |
| 11,271,428 | B2 | 3/2022 | Nakano et al. | |
| 11,293,957 | B2 | 4/2022 | Van Wageningen et al. | |
| 11,418,067 | B2 | 8/2022 | Mehas et al. | |
| 11,496,000 | B2 | 11/2022 | Muratov et al. | |
| 11,532,957 | B2 | 12/2022 | Park et al. | |
| 11,581,756 | B2 | 2/2023 | Mynar et al. | |
| 2005/0024165 | A1 | 2/2005 | Hsu | |
| 2012/0077537 | A1 | 3/2012 | Muratov et al. | |
| 2013/0076153 | A1 | 3/2013 | Murayama et al. | |
| 2013/0162054 | A1 | 6/2013 | Komiyama | |
| 2014/0015522 | A1 | 1/2014 | Widmer | |
| 2014/0044293 | A1 | 2/2014 | Ganem et al. | |
| 2015/0323694 | A1 | 11/2015 | Roy et al. | |
| 2016/0329751 | A1 | 11/2016 | Mach et al. | |
| 2017/0010307 | A1 | 1/2017 | Komiyama | |
| 2017/0063165 | A1 | 3/2017 | Baarman et al. | |
| 2017/0117756 | A1* | 4/2017 | Muratov | H02J 50/60 |
| 2017/0299754 | A1 | 10/2017 | Mack et al. | |
| 2017/0302111 | A1 | 10/2017 | Krupezevic et al. | |
| 2018/0233954 | A1 | 8/2018 | Yang | |
| 2018/0241257 | A1 | 8/2018 | Muratov et al. | |
| 2018/0262065 | A1 | 9/2018 | Weidner | |
| 2018/0323658 | A1* | 11/2018 | Cheikh | H02J 50/20 |
| 2019/0131826 | A1 | 5/2019 | Park et al. | |
| 2019/0165518 | A1 | 5/2019 | Hsu et al. | |
| 2019/0165618 | A1 | 5/2019 | Chen et al. | |
| 2019/0190320 | A1 | 6/2019 | Park | |
| 2019/0296591 | A1 | 9/2019 | Park | |
| 2019/0312468 | A1 | 10/2019 | Kwon et al. | |
| 2019/0319494 | A1 | 10/2019 | Park | |
| 2019/0319495 | A1 | 10/2019 | Park et al. | |
| 2019/0326782 | A1 | 10/2019 | Graham et al. | |
| 2020/0083754 | A1 | 3/2020 | Tian et al. | |
| 2020/0119595 | A1* | 4/2020 | Nakano | H02J 50/12 |
| 2020/0169123 | A1 | 5/2020 | Mehas et al. | |
| 2020/0195064 | A1* | 6/2020 | Cai | H02J 50/12 |
| 2020/0200937 | A1 | 6/2020 | Widmer | |
| 2020/0204005 | A1 | 6/2020 | Lee et al. | |
| 2020/0235612 | A1 | 7/2020 | Muratov | |
| 2020/0328616 | A1 | 10/2020 | Van Wageningen et al. | |
| 2020/0343765 | A1 | 10/2020 | Kwon et al. | |
| 2020/0373789 | A1 | 11/2020 | Park | |
| 2021/0057939 | A1* | 2/2021 | Muratov | H02J 50/60 |
| 2021/0066973 | A1 | 3/2021 | Park et al. | |
| 2021/0135506 | A1 | 5/2021 | Muratov | |
| 2021/0257864 | A1* | 8/2021 | Stingu | H02J 50/80 |
| 2021/0273492 | A1* | 9/2021 | Sherman | H02J 50/80 |
| 2021/0351631 | A1 | 11/2021 | Park | |
| 2022/0123598 | A1 | 4/2022 | Wu et al. | |
| 2022/0320911 | A1 | 10/2022 | Schwartz et al. | |
| 2023/0006473 | A1 | 1/2023 | Gao et al. | |
| 2023/0047559 | A1 | 2/2023 | Kim et al. | |
| 2023/0053186 | A1 | 2/2023 | Tokaldani et al. | |
| 2023/0118967 | A1 | 4/2023 | Choi et al. | |
| 2023/0238836 | A1* | 7/2023 | Jin | H02J 50/90<br>320/108 |
| 2023/0307961 | A1 | 9/2023 | Schwartz et al. | |
| 2024/0223015 | A1* | 7/2024 | Shichino | H02J 7/0048 |
| 2025/0038578 | A1* | 1/2025 | Shichino | H02J 7/00034 |

FOREIGN PATENT DOCUMENTS

| | | | |
|---|---|---|---|
| DE | 202016100924 | U1 | 5/2017 |
| EP | 3393009 | A1 | 10/2018 |
| EP | 3673563 | B1 | 12/2022 |
| JP | 2017022999 | A | 1/2017 |
| JP | 2017529056 | A | 9/2017 |
| JP | 2017535235 | A | 11/2017 |
| JP | 2019515629 | A | 6/2019 |
| JP | 2023107754 | A | 8/2023 |
| KR | 10-2017-0118571 | A | 10/2017 |
| KR | 10-20180010796 | A | 1/2018 |
| KR | 10-2018-0022513 | A | 3/2018 |
| KR | 1020200057913 | A | 5/2020 |
| KR | 10-2023-0011607 | A | 1/2023 |
| KR | 10-2023-0113930 | A | 8/2023 |
| WO | 2015154086 | A | 10/2015 |
| WO | 2016091764 | A1 | 6/2016 |
| WO | 2015128901 | A | 3/2017 |
| WO | 2017174380 | A1 | 10/2017 |
| WO | 2019229229 | A1 | 12/2019 |
| WO | 2020015746 | A1 | 1/2020 |
| WO | 2020101767 | A1 | 5/2020 |
| WO | 2021113383 | A1 | 6/2021 |
| WO | 2021177987 | A1 | 9/2021 |
| WO | 2022212094 | A1 | 10/2022 |

OTHER PUBLICATIONS

International Search Report and Written Opinion for PCT Application No. PCT/US2024/043669, dated Nov. 13, 2024; 13 pgs.

Anonymous: "Qi Specification—Power Delivery (Version 1.3)"; Wireless Power Consortium, Jan. 1, 2021, Chapter Qi Specification Foreign Object Detection version 1.3 Jan. 2021; pp. 1-34 (XP093212389).

International Search Report and Written Opinion for PCT Application No. PCT/US2024/043682, dated Dec. 20, 2024; pp. 14.

* cited by examiner $$V(j\omega) = (j\omega L + R) I(j\omega)$$

$$a = \left| \frac{V(j\omega)}{I(j\omega)} \right|^2 = \omega^2 L^2 + R^2$$

$$\theta = \angle\left(\frac{V(j\omega)}{I(j\omega)}\right) = \tan^{-1}\frac{\omega L}{R}$$

$$Q = \frac{\omega L}{R} = \tan(\theta)$$

$$L = \frac{\sqrt{\frac{aQ^2}{Q^2+1}}}{\omega}$$

$$R = \sqrt{\frac{a}{Q^2+1}}$$

$$Q_{comp} \triangleq Q' \left(\frac{\omega_0}{\omega}\right)\left(\frac{1+\kappa_R \Delta T}{1+\kappa_L \Delta T}\right)\left(\frac{R^{meas}}{R_{DC,0} + R_{AC}(\Delta\omega) / (1+\eta\Delta\omega)}\right)$$

FIG. 6

OBJECT DETECTION FOR WIRELESS POWER TRANSFER

CROSS-REFERENCE TO RELATED APPLICATIONS

This application claims priority to U.S. Provisional Application No. 63/581,318, filed Sep. 8, 2023, entitled "Mated-Q Object Detection for High Power Wireless Power Transfer," and U.S. Provisional No. 63/605,047, filed Dec. 1, 2023, entitled "Object Detection for Wireless Power Transfer", both of which are incorporated by reference herein in their entirety.

BACKGROUND

Electronic devices, such as smartphones, tablet computers, smart watches, wireless earphones, styluses, etc. may employ wireless power transfer to facilitate charging of batteries within the devices. As a result, it may be desirable to provide increased levels of power transfer. However, such higher power levels can cause a need for improved detection of other objects that can affect or be affected by the wireless power transfer.

SUMMARY

A wireless power transmitter can include wireless power transmitting circuitry having a wireless power transmitting coil that transmits wireless power signals; and control circuitry coupled to the wireless power transmitting circuitry that: measures a present value of a first function of quality factor and resonant frequency of the wireless power transmitting coil and a present value of a second function of quality factor and resonant frequency of the wireless power transmitting coil while the wireless power transmitter is coupled to a wireless power receiver; determines a change between the measured present values and corresponding baseline values of the first and second functions of quality factor and resonant frequency of the wireless power transmitting coil; determines whether a foreign object is present responsive to the change between the measured present values and corresponding baseline values of the first and second functions of quality factor and resonant frequency exceeding a threshold in a magnetic state space. The first function of quality factor and resonant frequency can be quality factor. The second function of quality factor and resonant frequency can be resonant frequency. The threshold can include multiple linear thresholds.

A wireless power transmitter can include wireless power transmitting circuitry having a wireless power transmitting coil that transmits wireless power signals; and control circuitry coupled to the wireless power transmitting circuitry that: measures a present value of a first function of quality factor, resonant frequency, and coupling coefficient of the wireless power transmitting coil, a present value of a second function of quality factor, resonant frequency, and coupling coefficient of the wireless power transmitting coil, and a third function of quality factor, resonant frequency, and coupling coefficient of the wireless power transmitting coil while the wireless power transmitter is coupled to a wireless power receiver; determines a distance between the measured present values of the first, second, and third functions of quality factor, resonant frequency, and coupling coefficient of the wireless power transmitting coil and a curve fit to corresponding baseline values; determines whether a foreign object is present responsive to a distance between the measured present values of the first, second, and third functions of quality factor, resonant frequency, and coupling coefficient and the curve fit to the corresponding baseline values in a magnetic state space exceeding a threshold or falling between multiple thresholds.

The first, second, and third functions of quality factor, resonant frequency, and coupling coefficient can be selected to provide a linear curve fit in the magnetic state space. The first function of quality factor, resonant frequency, and coupling coefficient can be coupling coefficient squared. The second function of quality factor, resonant frequency, and coupling coefficient can be resonant frequency squared, and the third function of quality factor, resonant frequency, and coupling coefficient can be the inverse of resonant frequency times quality factor. The distance can be an L1 distance or an L2 distance (or any other suitable distance).

The control circuitry can inhibit wireless power transfer in response to detecting the foreign object. The control circuitry can transfer power at a level below a maximum power level in response to detecting the foreign object.

The control circuitry can measure a present quality factor and resonant frequency of the wireless power transmitting coil by: causing an inverter to provide one or more signal pulses to the wireless power transmitter coil; using measurement circuitry to measure responses to the provided one or more signal pulses, wherein the responses include a ringing signal with a decay envelope characterized by a frequency of the ringing signal and the present quality factor; and determining the present quality factor and resonant frequency from the frequency of the ringing signal.

The control circuitry can characterize a foreign object as a moderate foreign object or strong foreign object based on the distance between the measured present values of the first, second, and third functions of quality factor, resonant frequency, and coupling coefficient of the wireless power transmitting coil and the curve fit to the corresponding baseline values. The control circuitry can inhibit wireless power transfer in response to determining that the foreign object is a strong foreign object. Alternatively, the control circuitry can allow wireless power transfer at a relatively lower power level in response to determining that the foreign object is a moderate foreign object.

The corresponding baseline values can be measured during manufacture of the wireless power transmitter. The corresponding baseline values can be updated during in-field operation of the wireless power transmitter. The control circuitry can determine the distance between the measured present values of the first, second, and third functions of quality factor, resonant frequency, and coupling coefficient of the wireless power transmitting coil using scale factors based on a particular transmitter receiver pairing.

A method of operating a wireless power transmitter having wireless power transmitting circuitry that includes a wireless power transmitting coil configured to transmit wireless power signals and control circuitry coupled to the wireless power transmitting circuitry can be performed by the wireless power control circuitry and can include: measuring a present value of a first function of quality factor and resonant frequency of the wireless power transmitting coil and a present value of a second function of quality factor and resonant frequency of the wireless power transmitting coil while the wireless power transmitter is coupled to a wireless power receiver; comparing the measured present values of the first and second functions of quality factor and resonant frequency of the wireless power transmitting coil to corresponding baseline values; and detecting a foreign object based at least partly on the comparison of the measured present values of the first and second functions of quality factor and resonant frequency to the corresponding baseline values.

The first function of quality factor and resonant frequency can be quality factor. The second function of quality factor and resonant frequency can be resonant frequency. Comparison of the measured present values of the first and second functions of quality factor and resonant frequency to the corresponding baseline values can include determining whether a difference between the measured present values and corresponding baseline values exceeds a threshold comprising multiple linear thresholds.

A method of operating a wireless power transmitter having wireless power transmitting circuitry that includes a wireless power transmitting coil configured to transmit wireless power signals and control circuitry coupled to the wireless power transmitting circuitry can be performed by the wireless power control circuitry and can include: measuring a present value of a first function of quality factor, resonant frequency, and coupling coefficient of the wireless power transmitting coil, a present value of a second function of quality factor, resonant frequency, and coupling coefficient of the wireless power transmitting coil, and a present value of a third function of quality factor, resonant frequency, and coupling coefficient of the wireless power transmitting coil of the wireless power transmitting coil while the wireless power transmitter is coupled to a wireless power receiver; comparing the measured present values of the first, second, and third functions of quality factor, resonant frequency, and coupling coefficient of the wireless power transmitting coil to corresponding baseline values by determining a distance between the measured present values of the first, second, and third functions of quality factor, resonant frequency, and coupling coefficient of the wireless power transmitting coil and a curve fit to corresponding baseline values in a magnetic state space; and detecting a foreign object based at least partly on a distance between the measured present values of the first, second, and third functions of quality factor, resonant frequency, and coupling coefficient and the curve fit to the corresponding baseline values in a magnetic state space exceeding a threshold.

The first, second, and third functions of quality factor, resonant frequency, and coupling coefficient can be selected to provide a linear curve fit in the magnetic state space. The first function of quality factor, resonant frequency, and coupling coefficient can be coupling coefficient squared. The second function of quality factor, resonant frequency, and coupling coefficient can be resonant frequency squared. The third function of quality factor, resonant frequency, and coupling coefficient can be the inverse of resonant frequency times quality factor. The distance can be an L1 distance or an L2 distance (or any other suitable distance).

Measuring a present quality factor and resonant frequency of the wireless power transmitting can include: causing an inverter to provide one or more signal pulses to the wireless power transmitter coil; using measurement circuitry to measure responses to the provided one or more signal pulses, wherein the responses include a ringing signal with a decay envelope characterized by a frequency of the ringing signal and the present quality factor; and determining the present quality factor from the frequency of the ringing signal.

The method can further include inhibiting wireless power transfer in response to detecting the foreign object. The method can further include transferring power at a level below a maximum power level in response to detecting the foreign object.

The method can further include characterizing a foreign object as a moderate foreign object or strong foreign object based on the distance between the measured present values and the curve fit to the corresponding baseline values in the magnetic state space. The method can further include inhibiting wireless power transfer in response to determining that the foreign object is a strong foreign object. The method can alternatively include allowing wireless power transfer at a relatively lower power level in response to determining that the foreign object is a moderate foreign object.

The corresponding baseline values can be measured during manufacture of the wireless power transmitter. The corresponding baseline values can be updated during in field operation of the wireless power transmitter. The method can further include scaling the corresponding baseline values using scale factors based on a particular transmitter receiver pairing.

BRIEF DESCRIPTION OF THE DRAWINGS

FIG. 6 is an equation illustrating compensation factors that can be applied to a present quality factor measurement to determine a compensated quality factor value.

DETAILED DESCRIPTION

Figure 1:
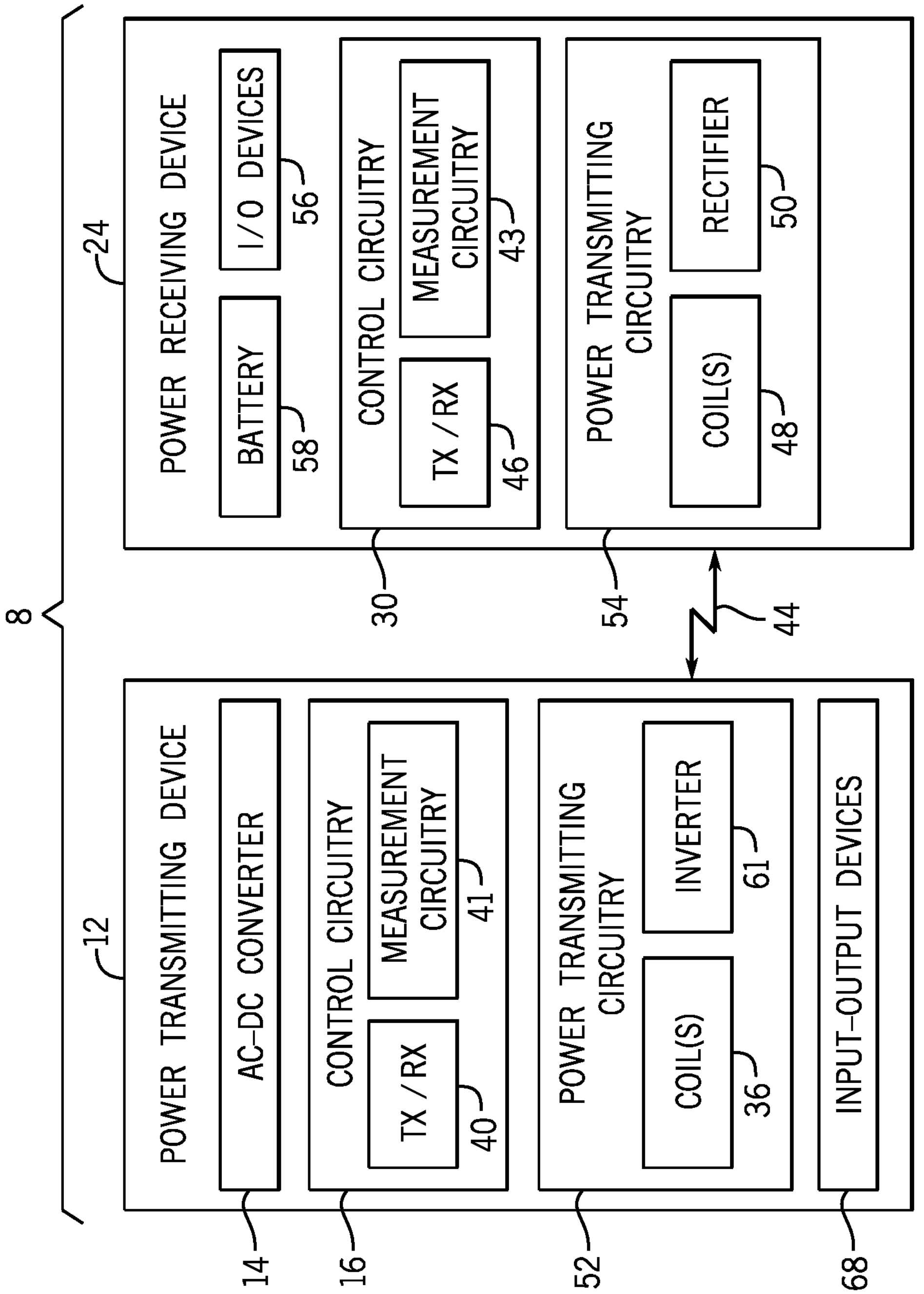
FIG. 1 illustrates a block diagram of an illustrative wireless power transfer system.

In the following description, for purposes of explanation, numerous specific details are set forth to provide a thorough understanding of the disclosed concepts. As part of this description, some of this disclosure's drawings represent structures and devices in block diagram form for simplicity. In the interest of clarity, not all features of an actual implementation are described in this disclosure. Moreover, the language used in this disclosure has been selected for readability and instructional purposes and has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

A wireless power system can include a wireless power transmitting device such as a wireless charging puck or mat. The wireless power transmitting device can wirelessly transmit power to a wireless power receiving device. The wireless power receiving device may be a device such as a wristwatch, cellular telephone, tablet computer, laptop computer, or other electronic equipment. The wireless power receiving device can use power from the wireless power transmitting device for powering the device and/or for charging an internal battery. Wireless power can be transmitted from the wireless power transmitting device to the wireless power receiving device using one or more wireless power transmitting coils. The wireless power receiving device can have one or more wireless power receiving coils coupled to rectifier circuitry that can convert received wireless power signals into direct-current power.

If a foreign object such as a paperclip, coin, or other metallic object is present near the wireless power transmitting coil of the wireless power transmitting device, eddy current generation in the foreign object may elevate the temperature of the foreign object. To determine whether such a foreign object is present in the vicinity of the wireless power transmitting device, the wireless power transmitting device can measure the quality factor (also known as "Q-factor" or "Q") of the wireless power transmitting coil and determine whether the quality factor has been affected by the presence of a foreign object. In some cases, the Q-factor can be measured in "open air," meaning that the transmitter is not coupled to a receiver. In some cases, as discussed in greater detail below, the Q-factor can be measured as "mated," meaning that the transmitter is coupled to a receiver device. In either/both cases, detecting whether a foreign object is present can allow suitable action to be taken (e.g., the wireless power transmitting device may forgo wireless power transfer operations or reduce a power level transferred whenever a foreign object is detected).

An illustrative wireless power system (wireless charging system) is shown in FIG. 1. Wireless power system 8 can include a wireless power transmitter 12 and a wireless power receiver 24. Wireless power transmitter 12 can include control circuitry 16. Wireless power receiver 24 can include control circuitry 30. The respective control circuitries can be used to control the operation of wireless power system 8. This control circuitry may include processing circuitry associated with microprocessors, power management units, baseband processors, digital signal processors, microcontrollers, and/or application-specific integrated circuits with processing circuits. The processing circuitry can implement desired control and communications features in wireless power transmitter 12 and wireless power receiver 24. For example, the processing circuitry may be used in selecting coils, determining power transmission levels, processing sensor data and other data to detect foreign objects and perform other tasks, processing user input, handling negotiations between wireless power transmitter 12 and wireless power receiver 24, sending and receiving in-band and out-of-band data, making measurements, and otherwise controlling the operation of wireless power system 8.

Control circuitry 16, 30 in system 8 may be configured to perform operations using hardware (e.g., dedicated hardware or circuitry), firmware, and/or software. Software code for performing operations in system 8 can be stored on non-transitory computer readable storage media (e.g., tangible computer readable storage media) in the control circuitry. The software code may sometimes be referred to as software, data, program instructions, instructions, and/or code. The non-transitory computer readable storage media may include non-volatile memory such as non-volatile random-access memory (NVRAM), one or more hard drives (e.g., magnetic drives or solid-state drives), one or more removable flash drives, or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU), or other processing circuitry, including analog, digital, and/or hybrid circuitry.

Wireless power transmitter 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitter 12 is a wireless charging mat are sometimes described herein as an example.

Wireless power receiver 24 may be a portable electronic device such as a wristwatch, a cellular telephone, a laptop computer, a tablet computer, an accessory such as an earbud, stylus, or other electronic equipment. Wireless power transmitter 12 may be coupled to a wall outlet (e.g., an alternating current power source), may have a battery for supplying power, and/or may have another source of power. Wireless power transmitter 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 can use power transmitting circuitry 52 to transmit wireless power to power receiving circuitry 54 of wireless power receiver 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Multiple coils 36 may be arranged in a planar coil array (e.g., in configurations in which device 12 is a wireless charging mat) or may be arranged to form a cluster of coils (e.g., in configurations in which device 12 is a wireless charging puck). In some arrangements, wireless power transmitter 12 (e.g., a charging mat, puck, etc.) may have only a single coil. In other arrangements, a wireless power transmitter may have multiple coils.

As the AC currents pass through one or more coils 36, alternating-current electromagnetic (e.g., magnetic) fields (wireless power signals 44) are produced that are received by one or more corresponding receiver coils such as coil(s) 48 in wireless power receiver 24. Wireless power receiver 24 may have a single coil 48 or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-250 kHz, 128 kHz, 326 kHz, 360 kHz, 300-400 kHz, 1.7-1.8 MHz, 6.78 MHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering wireless power receiver 24.

The DC voltage produced by rectifier circuitry 50 (sometimes referred to as rectifier output voltage $V_{rect}$) can be used in charging a battery such as battery 58 and can be used in powering other components in wireless power receiver 24. For example, wireless power receiver 24 may include input-output devices 56. Input-output devices 56 may include input devices for gathering user input and/or making environmental measurements and may include output devices for providing a user with output. As an example, input-output devices 56 may include a display for creating visual output, a speaker for presenting output as audio signals, light-emitting diode status indicator lights, and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of wireless power system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Wireless power transmitter 12 may have one or more input-output devices 68 (e.g., input devices and/or output devices of the type described in connection with input-output devices 56).

Wireless power transmitter 12 and/or wireless power receiver 24 may communicate wirelessly using in-band or out-of-band communications. Wireless power transmitter 12 may, for example, have wireless transceiver circuitry 40 that wirelessly transmits out-of-band signals to wireless power receiver 24 using an antenna. Wireless transceiver circuitry 40 may be used to wirelessly receive out-of-band signals from wireless power receiver 24 using the antenna. Wireless power receiver 24 may have wireless transceiver circuitry 46 that transmits out-of-band signals to device 12. Receiver circuitry in wireless transceiver 46 may use an antenna to receive out-of-band signals from wireless power transmitter 12. In-band transmissions between wireless power transmitter 12 and wireless power receiver 24 may be performed using coils 36 and 48. With one illustrative configuration, frequency-shift keying (FSK) of one or more parameters of the wirelessly transferred power (e.g., voltage, current, etc.) can be used to convey in-band data from wireless power transmitter 12 to wireless power receiver 24 and amplitude-shift keying (ASK) of one or more parameters of the wirelessly transferred power (e.g., voltage, current, etc.) can be used to convey in-band data from wireless power receiver 24 to wireless power transmitter 12. Power may be conveyed wirelessly from wireless power transmitter 12 to wireless power receiver 24 during these FSK and ASK transmissions.

It may be desirable for wireless power transmitter 12 and wireless power receiver 24 to be able to communicate information such as received power, other power level estimates, etc., to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 can include external object measurement circuitry 41 that can be used to detect whether external objects (including but not limited to "foreign objects") are present on or near the charging surface of the housing of wireless power transmitter 12 (e.g., to detect objects on the top of or adjacent to a charging mat or puck). The housing of wireless power transmitter 12 may have polymer walls, walls of other dielectric material, metal structures, fabric, and/or other housing wall structures that enclose coils 36 and other circuitry of wireless power transmitter 12. The charging surface may be a planer outer surface of the upper housing wall of wireless power transmitter 12 or an outer surface having other shapes (e.g., concave, convex, etc.). Circuitry 41 can detect foreign objects such as coins, paper clips, and other metallic objects and can detect the presence of wireless power receiver 24 (e.g., circuitry 41 can detect the presence of one or more wireless power receiving coils 48). During object detection and characterization operations, external object measurement circuitry 41 can be used to make measurements on coils 36 and/or on other coils such as optional additional foreign object detection coils in wireless power transmitter 12 to determine whether any wireless power receivers 24 and/or any foreign objects are present on or in the vicinity of wireless power transmitter 12.

In an illustrative arrangement, measurement circuitry 41 of control circuitry 16 can include signal generator circuitry such as a pulse generator that can supply control signals to inverter 61. These control signals can cause inverter 61 to create impulses so that impulse responses can be measured by circuitry 41 (e.g., by using a voltage sensor, an analog-to-digital converter configured to convert analog voltage measurements to digital voltage measurements, and/or other sensing circuitry). Measurement circuitry 41 may also have alternating current sources and/or other circuitry for making measurements on coil 36.

In some embodiments, quality factor measurements can be made on coil 36 to determine whether a foreign object is present. These quality factor measurements can include measurements of various observables of the wireless power system and need not be limited to Q-factor. Such factors could include, without limitation, resonant frequency, coupling factor, self-inductance, and combinations of these and other observables. For the description herein, Q-factor measurements are exemplary, but measurements of other observables can be substituted unless context clearly dictates otherwise. For example, direct impedance measurements and/or impulse responses can be analyzed to make quality factor (Q-factor) measurements on coil 36. Measurements of the Q-factor of coil 36 (including measurements of changes in the Q-factor value from a baseline value) may be performed at any suitable time such as prior to transmitting wireless power from wireless power transmitter 12 to wireless power receiver 24. This can include measurements made in "open air" meaning that no wireless power receiver 24 is present and/or measurements made in a "mated" condition meaning that a wireless power receiver 24 is present and coupled to wireless power transmitter 12. In the open-air case, if the Q-factor value deviates by more than a threshold amount (causing a "deflection" of the Q-factor), and the object causing the Q-factor deflection does not respond to a subsequent digital ping or other attempts to establish communication, wireless power transmitter 12 can conclude that a foreign object is present on coil 36 and can forgo wireless power transmission and/or take other suitable action (e.g., by transmitting power at a restricted level that is lower than the level permitted in absence of detecting the foreign object, by halting power transmission, etc.). In the mated case, mated Q-factor measurements can be used to detect the introduction of a foreign object during or after the initiation of wireless power transfer. Such an event can similarly cause either the inhibition of wireless power transfer and/or a reduction of the power level to a restricted level as described above. In general, the Q-factor measurements can be performed using the same hardware and methodology whether open-air or mated, and the control techniques implemented by the respective control circuitries can be configured to respond as appropriate to Q-factor (or resonant frequency) deflections based on thresholds and logics appropriate to the respective regimes.

Figure 2:
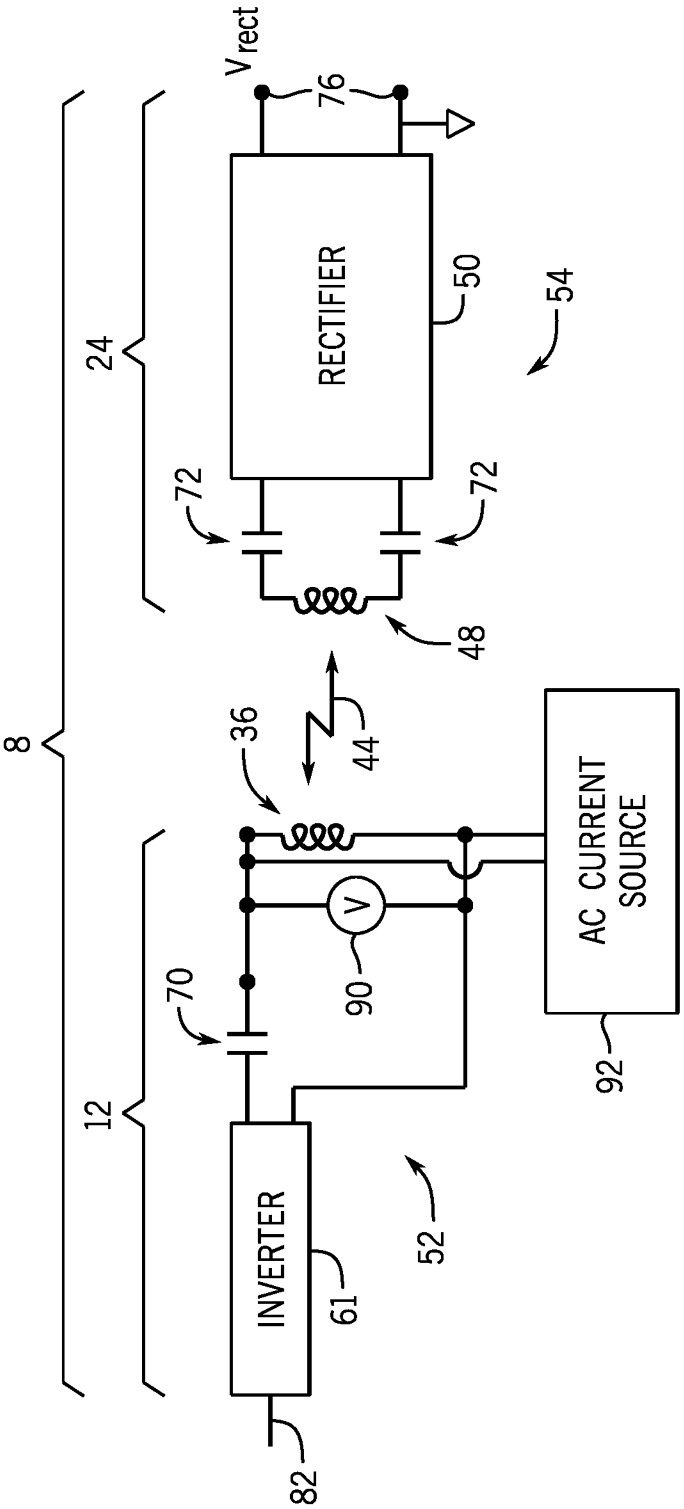
FIG. 2 illustrates a simplified schematic diagram of a wireless power transfer system.

FIG. 2 shows illustrative circuitry in wireless power transfer system 8 that allows measurements to be made of the Q-factor of coil 36. The wireless power circuitry of FIG. 2 can include wireless power transmitting circuitry 52 in wireless power transmitter 12 and wireless power receiving circuitry 54 in wireless power receiver 24. During operation, wireless power signals 44 can be transmitted by wireless power transmitting circuitry 52 and can be received by wireless power receiving circuitry 54. As shown in FIG. 2, wireless power transmitting circuitry 52 can include inverter circuitry 61.

Inverter circuitry (inverter) 61 can be used to provide signals to coil 36. During wireless power transmission, the control circuitry of wireless power transmitter 12 can supply signals to control input 82 of inverter circuitry 61 that can cause inverter 61 to supply alternating current (AC) drive signals to coil 36. Circuit components such as capacitor 70 may be coupled in series with coil 36 as shown in FIG. 2. When alternating-current (AC) current signals are supplied to coil 36, corresponding alternating-current electromagnetic signals (wireless power signals 44) can be transmitted to nearby coils such as illustrative coil 48 in wireless power receiving circuitry 54, which can induce a corresponding AC current signal in coil 48. Capacitors such as capacitors 72 may be coupled in series with coil 48. Rectifier 50 can receive the AC current from coil 48 and can produce corresponding direct-current power (e.g., direct-current voltage $V_{rect}$) at output terminals 76. This power may be used to power a load.

Wireless power transmitter 12 can have measurement circuitry for monitoring signals on coil 36. This circuitry may include, for example, voltage sensor 90 (e.g., a voltage sensing circuit coupled to and/or formed as part of an analog-to-digital converter, etc.). Current source 92 and/or inverter 61 can also be used to supply signals to coil 36 during foreign object detection operations (e.g., so that Q may be measured for coil 36). In some embodiments, Q-factor measurements can be made using direct measurement of the impedance of coil 36 with an AC current source.

Measurements of Q may be made in the presence of wireless power receiving device 24 ("mated-Q measurements) and/or in the absence of any wireless power receiving devices ("open air" measurements). In some applications or embodiments, periodic open-air Q measurements may be made when a wireless power receiver 24 is not present, and/or periodic mated-Q measurements may be made when a wireless power receiver 24 is present. By monitoring changes in Q (whether open air or mated), the presence of a foreign object can be detected, and appropriate action taken.

Figure 3:
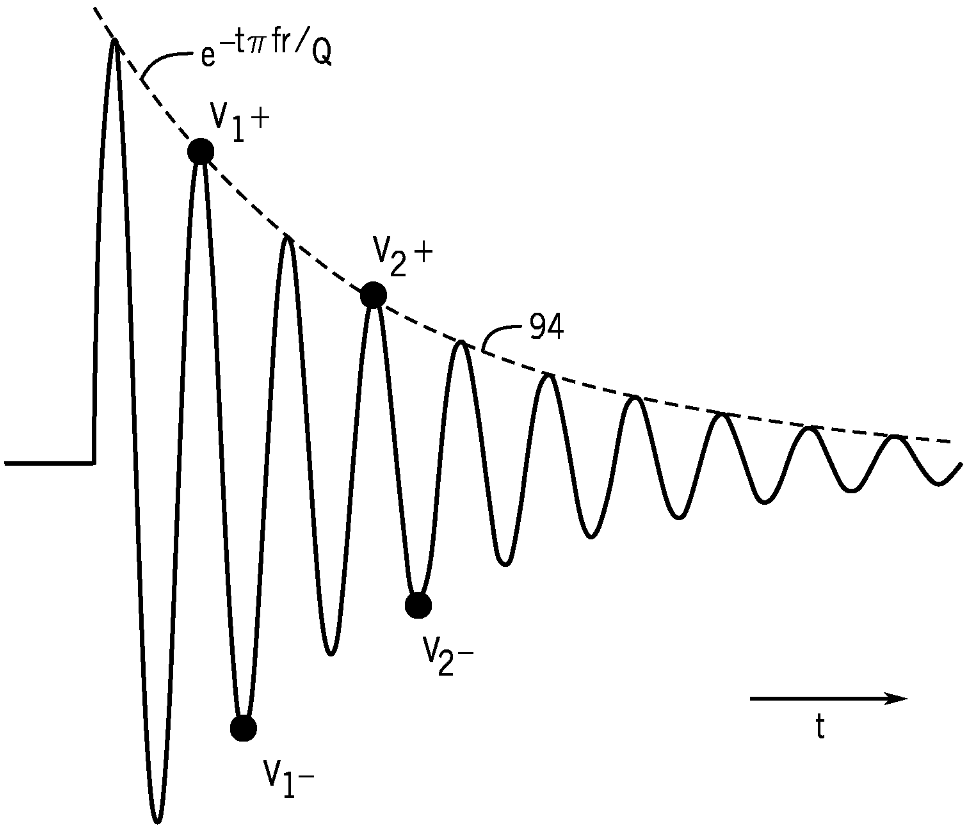
FIG. 3 illustrates a graph showing the impulse response of a wireless power transmitting coil that can be analyzed to measure a quality factor value for the coil.

With a first illustrative Q-factor measurement arrangement, the control circuitry of device 12 can cause inverter 61 to provide signal pulses to coil 36 and measurement circuitry such as voltage sensor 90 is used to measure corresponding impulse responses. Due to resonance in the circuit of FIG. 2, application of a signal pulse to coil 36 creates a ringing signal with a decay envelope such as the decay envelope 94 illustrated in FIG. 3. The decay envelope can have a decay envelope given by $$e^{\frac{\pi f_r}{Q}t},$$

where $f_r$ is the frequency of the ringing signal. By measuring $f_r$ and decay envelope 94, the value of Q can be determined. An equivalent approach that may be more computationally tractable can be achieved by sampling of the waveform peaks to obtain the waveform envelope. That is, define:

$$V_i = V_i^+ - V_i^-, i = 1, 2 \tag{1}$$

then $$Q = \frac{\pi N}{\ln(V_1/V_2)} \tag{2}$$

where N is the separation (in terms of number of peaks) between the second samples and the first samples (e.g., N=1 means the peaks are adjacent).

If desired, capacitor 70 of FIG. 2 may be implemented using an adjustable capacitor arrangement, such as a capacitor circuit with switching circuitry and multiple capacitors that can be selectively switched into use under control of control circuitry 16 to adjust the capacitance value in the resonant circuit and thereby adjust the resonant frequency. In arrangements in which capacitor 70 has a selectable or otherwise controllable value, a first value (e.g., C1) can be used when the impulse response of the wireless power transmitting circuitry is being measured to determine Q (as described in connection with FIG. 3) and a second value (e.g., C2) can be used when the wireless power transmitting circuitry is transmitting wireless power signals 44. In other embodiments, a single capacitance value can be used in both operations.

Figures 4, 5:
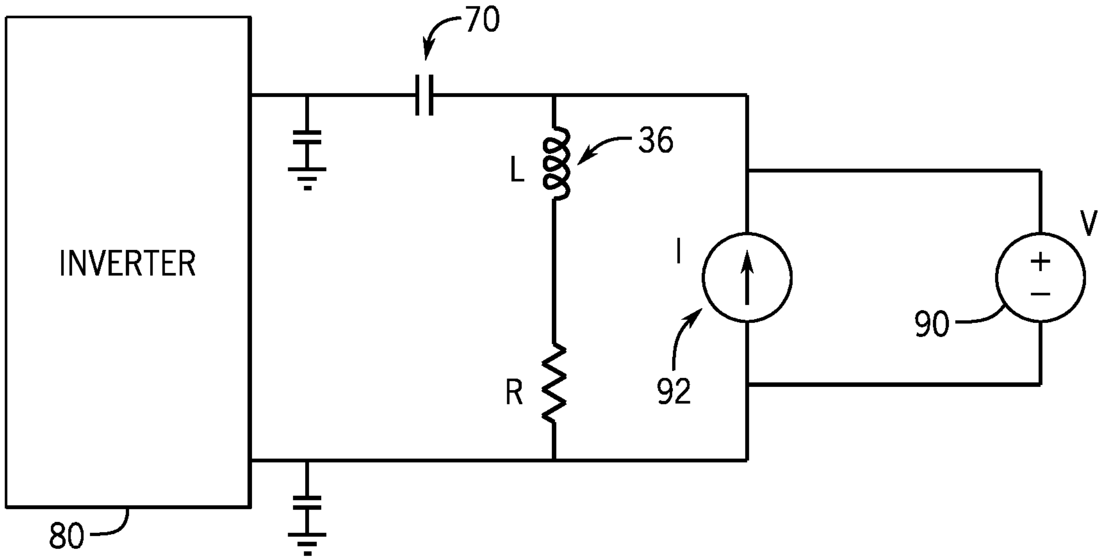
FIG. 4 is a simplified schematic diagram of a wireless power transmitter showing circuitry that can be used to make quality factor measurements.
FIG. 5 depicts equations that can be used to determine parameters such as a coil quality factor based on impedance measurements.

With a second illustrative Q-factor measurement arrangement, the value of Q can be obtained from a direct measurement of the impedance of coil 36. FIG. 4 is a circuit diagram of the wireless power transmitting circuitry and measurement circuitry of FIG. 2, showing how a parasitic resistance, R, may be associated with the resonant circuit. With the direct impedance measurement approach, a small current can be injected into coil 36 from current source 92 while voltage measurements can be made using voltage sensor 90. The magnitude of the injected current can be sufficiently low to allow the current to be injected without using large power field-effect transistors. The current may be, for example, an alternating-current (AC) current at a frequency selected to optimize the ability to distinguish the presence of a foreign object based on the LC tank design. In some cases, this could be a frequency of 125 kHz. However, depending on the design, a higher or lower frequency could be used. For example, another design may have a 150-300 kHz range, although any suitable frequency could be used. In any case, this frequency can be selected independent of the resonant frequency associated with the wireless power transmitting circuit. The complex impedance of coil 36 can then be determined at this frequency, and the value of Q can be inferred from the angle θ of the measured impedance. FIG. 5 shows equations associated with the determination of Q (coil Q-factor) from the angle of the complex impedance and optional values of inductance, L, and resistance, R, (the real part of the AC impedance) that may be computed from the direct impedance measurement. In the equations of FIG. 5, I is the injected AC current, and V is the resulting voltage that is measured by voltage sensor 90.

Measurement circuitry 41 of device 12 can be calibrated during manufacturing. For example, the value of Q-factor ($Q_0$) that is measured at an initial time when device 12 is being manufactured (using the first illustrative Q-factor measurement arrangement, the second illustrative Q-factor measurement arrangement, and/or additional Q-factor measurement techniques) can be stored in device 12 as a baseline value for later use. Likewise, calibration can be performed for other observables to be measured, such as resonant frequency and the like. If desired, device-specific calibration operations may be performed so that each device 12 is individually calibrated with a corresponding individual baseline value of Q. When device 12 is operated in the field, device 12 can measure the present value of Q and can compare this measured value of Q to the stored baseline value of $Q_0$ from the factory. In this way, the amount of change in Q or other observables can be determined, which is indicative of whether a foreign object or other external object is present in the vicinity of wireless power transmitter 12.

If desired, compensation techniques may be used to compensate for the effects of temperature, aging, and other effects that can induce drift in Q or other measured parameters. For the following calibration example, a particular Q compensation technique is discussed, although other compensation techniques may be applied, and compensation of measured observables other than Q-factor (such as resonant frequency, coupling factor, etc.) can also be employed. Temperature variations can affect the parasitic resistance of components such as coil 36. Coil inductance L can also depend on temperature. Frequency changes and aging effects (e.g., mechanical wear) can affect component values and therefore the measured value of Q as well. Compensating for these effects when comparing Q to $Q_0$ can help enhance the accuracy of foreign object detection measurements.

The value of baseline Q-factor $Q_0$ and the value of resonant frequency $\omega_0$, i.e., $2\pi f_r$, that are measured during calibration (e.g., at an initial time during manufacturing), and can be given by equations 3 and 4.

$$Q_0 = \omega_0 L_0 / R_0 \tag{3}$$

$$\omega_0 = 1/\sqrt{L_0 C} \tag{4}$$

where $R_0$ increases with $\omega_0$ due to the skin effect. The values of Q and ω (and of L and R) that are measured at runtime (sometimes referred to as current Q, current ω, current L and current R) are given, respectively, by $Q_{FO}$, $\omega_{FO}$, $L_{FO}$, and $R_{FO}$ (where $R_{FO}$ is also a function of frequency) of equations 5, 6, 7, and 8.

$$Q_{FO}=\omega_{FO}L_{FO}/R_{FO} \tag{5}$$

$$\omega_{FO}=1/\sqrt{L_{FO}C} \tag{6}$$

$$L_{FO}=L_0+\Delta L_{FO} \tag{7}$$

$$R_{FO}=R_0+\Delta R_{FO} \tag{8}$$

During compensation operations, the current temperature T of wireless power transmitter 12 can be measured using temperature sensor 60 of wireless power transmitter 12 (see, e.g., FIG. 1). The change in temperature ΔT from the temperature $T_0$ measured during calibration measurements during manufacturing is given by equation 9.

$$\Delta T=T-T_0 \tag{9}$$

The equation of FIG. 6 shows how a compensated value of Q (e.g., the value of Qcomp) can be determined as a function of the currently measured Q-factor (Q' in the equation of FIG. 6) based on one or more compensation factors.

A first illustrative compensation factor involves frequency compensation. As shown in the equation of FIG. 6, Q' can be multiplied by compensation factor ($\omega_0/\omega$) to compensate for changes in resonant frequency during measurement of Q' relative to the resonant frequency during measurement of $Q_0$ in manufacturing. A second illustrative compensation factor relates to the temperature dependence of inductance and resistance. As shown in the equation of FIG. 6, Q' can be multiplied by the compensation factor $(1+\kappa_R\Delta T)/(1+\kappa_L\Delta T)$, where $\kappa_R$ is the resistive temperature change coefficient and $\kappa_L$ is the inductive temperature change coefficient. The values of these temperature coefficients can be influenced by the design of wireless power transmitter 12 and may, if desired, be determined empirically by performing measurements on one or more representative units of wireless power transmitter 12 during manufacturing. A third illustrative compensation factor involves compensating for shifts in the AC resistance $R_{AC}$ of coil 36 and DC resistance $R_{DC}$ of coil 36 from baseline values. With this resistance-compensation technique, the current value of the quality factor can be compensated based on a compensated value of the entire (total) inductive coil resistance associated with wireless power transmitting coil 36. Coil 36 can be characterized by an entire inductive coil resistance value having direct-current and alternating-current portions. During compensating operations, control circuitry 16 can compensate for changes in the entire inductive coil resistance by computing a compensated value of the entire inductive coil resistance from a sum of a baseline direct-current portion of the entire inductive coil resistance that was measured at an initial time and the current alternating-current portion of the entire coil resistance. This compensated entire inductive coil resistance value can then be used in compensating the current quality factor using the compensated entire inductive coil resistance. As shown in the equation of FIG. 6, the resistance-based compensation factor can be based on the measured baseline DC resistance ($R_{DC,0}$) that was obtained during calibration measurements during manufacturing, the baseline AC resistance ($R_{AC}$) that was obtained during calibration measurements during manufacturing, and the value of η, which is the coefficient of change in AC resistance $R_{AC}$ as a function of changes in resonant frequency co (e.g., 50 m-Ω per 100 kHz or other suitable value) that was obtained during calibration measurements during manufacturing. The parameter $R_{meas}$ is equal to the sum of the measured AC resistance $R_{AC}$ and measured DC resistance $R_{DC}$.

In the example of FIG. 6, all three of these illustrative compensation factors have been applied to the measured Q' value (e.g., Qcomp has been determined by compensating Q' based on changes in frequency and frequency-change-induced effects and for temperature-change-induced effects). In general, one or two of these compensation techniques may be used and/or other compensation techniques may be used to calibrate Q-factor measurements based on measured temperature, resonant frequency, and/or other variables. As set forth in the foregoing example, a compensated Q-factor value Qcomp may be produced based on measurements of temperature and frequency. This value can then be compared to a baseline value of Q that was measured during manufacturing and stored in device 12 for use during later comparisons. If desired, compensation operations may be performed on the baseline Q-factor value to produce a compensated baseline Q rather than performing compensation operations on the in-field measured value of Q. Approaches in which compensation operations are performed on an in-field measured Q value rather than on baseline Q value are described herein as an example.

Figure 7:
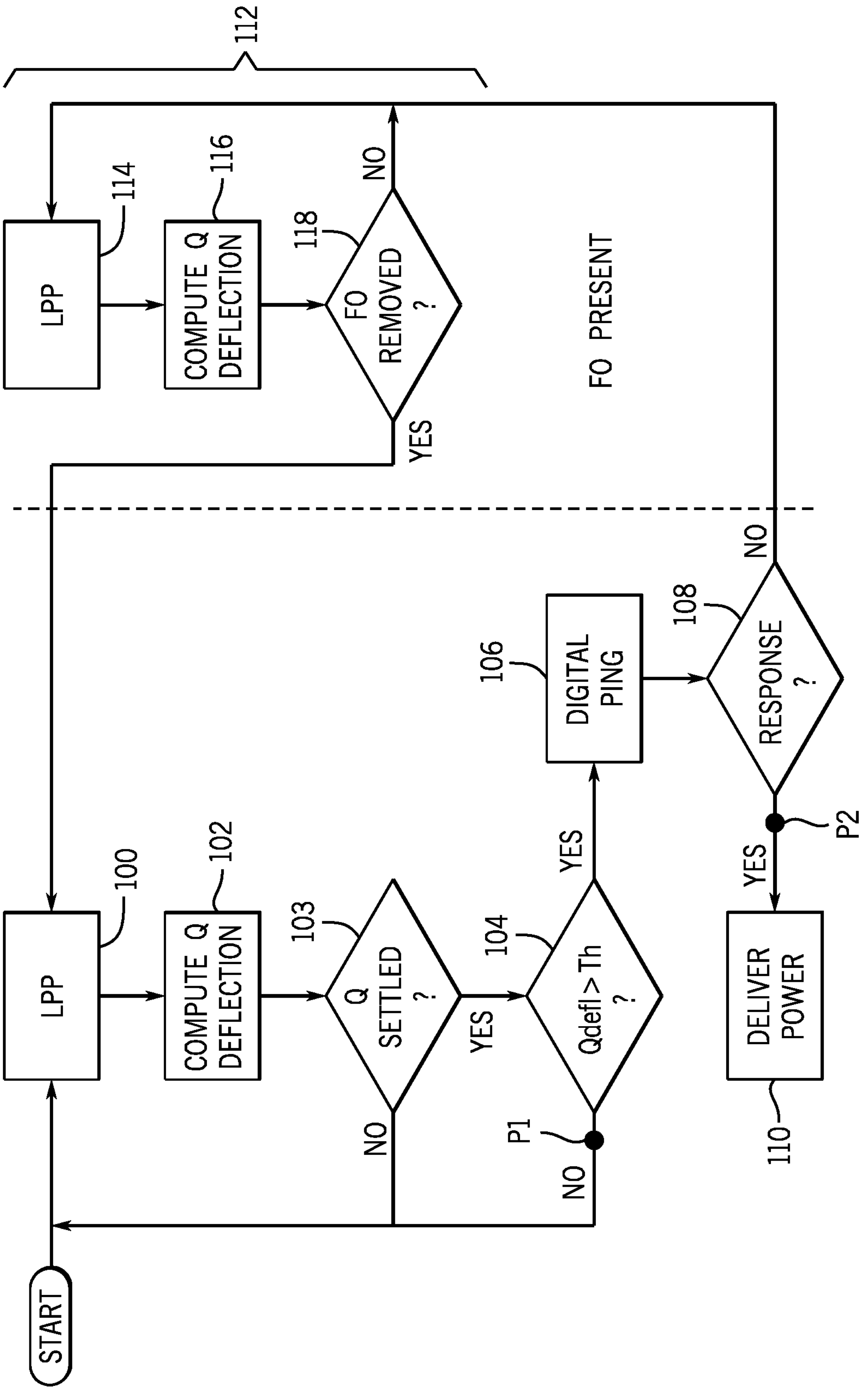
FIGS. 7 and 8 are diagrams showing illustrative foreign object detection operations based on the measured quality factor in a wireless power transfer system.

A flow chart of illustrative operations for detecting foreign objects using wireless power transfer system 8 is shown in FIG. 7. In this embodiment, power delivery can be inhibited if a foreign object is detected. It is also possible to simply flag the detection of the foreign object for use as additional information in determining appropriate power delivery levels during the power delivery phase. As an example, the maximum power level that is used during power delivery operations may be lowered to a predetermined level that is below the maximum power level in response to the detection of the presence of the foreign object.

During the operations of block 100, wireless power transmitter 12 can measure a current value of Q using the first illustrative Q-factor measurement arrangement (e.g., using inverter 61 to apply an impulse and measuring Q from envelope 94 of the impulse response) or the second illustrative Q-factor measurement arrangement (e.g., deriving Q from a direct impedance measurement of coil 36 performed by injecting current into coil 36 using AC current source 92). The measurement of Q using techniques such as these or other suitable Q-factor measurement techniques may sometimes be referred to as a low-power ping (LPP) or analog ping operation.

During the operations of block 102, the value of the change in Q (e.g., Q-factor deflection value $Q_{defl}$) can be determined. During the operations of block 102, compensation techniques such as the compensation techniques described in connection with FIG. 6 can be applied to compensate the measured value of Q or the baseline value of Q (i.e., $Q_0$) that was stored in wireless power transmitter 12 during manufacturing. The value of $Q_{defl}$ may, as an example, be computed using equation 10.

$$Q_{defl}=\frac{Q_0-Q_{comp}}{Q_0}=1-\frac{Q_{comp}}{Q_0} \tag{10}$$

In the example of equation 10, $Q_{defl}$ can be computed based at least partly on a difference between compensated measured Q (i.e., $Q_{comp}$) and baseline Q (i.e., $Q_0$) and at least partly on a ratio between $Q_{comp}$ and $Q_0$. With equation 10, if the current value of Q drops by 5% relative to baseline $Q_0$, $Q_{defl}$ will be 5%. In general, $Q_{defl}$ may be based only on a difference between measured Q and baseline Q, may be based only on a ratio between measured Q and baseline Q (e.g., $Q_{defl}$-$Q_{comp}/Q_0$), may be based on both a difference between measured and baseline Q and a ratio between measured Q and baseline Q, and/or may be based on other functions of measured Q and baseline Q. The measured values of Q and/or the baseline value of Q that are used in computing $Q_{defl}$ may be compensated for temperature, frequency, and/or aging effects as described in connection with the compensation techniques of FIG. 6. (As discussed in greater detail below, frequency deflection can be computed in the same manner.)

During the operations of block 103, the control circuitry of wireless power transmitter 12 can determine whether Q has settled. If Q is changing rapidly (e.g., due to the movement of an external object across the charging surface of wireless power transmitter 12 as measurements are being made), the value of $Q_{defl}$ may not be settled sufficiently and operations may return to block 100. A new measurement of Q may then be obtained during the operations of block 100. So long as Q has not settled, a new Q measurement may be obtained in this way for each 0.1 s (or at another suitable sampling rate). Once successive values of $Q_{defl}$ have changed by less than a predetermined threshold amount (e.g., 1%), Q can be deemed to have settled sufficiently to permit analysis of the value of $Q_{defl}$ to determine whether a foreign object is present, and operations may proceed to block 104.

During the operations of block 104, wireless power transmitter 12 can compare the value of $Q_{defl}$ to a predetermined threshold value TH (e.g., 3% or other suitable value). If $Q_{defl}$ does not exceed the threshold (e.g., if the measured value of Q has not been reduced by more than 3% relative to baseline Q), wireless power transmitter 12 can conclude that no external object is present (e.g., wireless power receiving device 24 is not present, and no foreign objects are present). Measurement operations may then continue at block 100. If, however, it is determined during the operations of block 104 that $Q_{defl}$ exceeds the threshold, device 12 can conclude that measured Q has been changed by more than the threshold amount relative to baseline $Q_0$ (e.g., Q is at least 3% lower than $Q_0$) and that therefore an external object of some type is present (either a foreign object or wireless power receiving device 24). Operations may then proceed to block 106 to distinguish between these two possibilities.

During the operations of block 106, wireless power transmitter 12 can attempt to wirelessly communicate with wireless power receiver 24. As an example, device 12 may use in-band communications to transmit a wireless digital request. The wireless digital request can be used to request that wireless power receiver 24 acknowledge its presence by using in-band communications to wirelessly transmit a corresponding digital response to wireless power transmitter 12. This digital communications request process may sometimes be referred to as a digital ping. During the operations of block 108, wireless power transmitter 12 can determine whether a response to the digital ping has been received from wireless power receiver 24 to indicate that a wireless power receiver is present.

If wireless power receiver 24 is present on the charging surface of wireless power transmitter 12, wireless power receiver 24 will respond to the digital ping with a wireless digital response. This response may include information such as a digital identifier corresponding to the type of wireless power receiver 24 that is present, etc. In response to determining, during the operations of block 108, that a cellular telephone, wristwatch, or other wireless power receiver 24 is present, wireless power transmitter 12 can transmit wireless power signals 44 to device 24 (e.g., during the operations of block 110). Subsequent mated-Q measurements can be made during this period as well, as described in greater detail below. Alternatively, if no wireless power receiver 24 is present on the charging surface of wireless power transmitter 12, wireless power transmitter 12 will not receive any acknowledgement from wireless power receiver 24. In response to determining, during the operations of block 108, that a wireless power receiver 24 is not present, wireless power transmitter 12 can conclude that a foreign object is present (which caused the measured Q deflection) and operations can proceed to block 112.

During block 112, wireless power transmitter 12 can monitor Q to determine when the foreign object that is present has been removed. In particular, Q can be measured during the operations of block 114, as described in connection with the Q measurements of block 100. The value of $Q_{defl}$ can be computed at block 116. The operations of block 118 can include comparing $Q_{defl}$ to threshold TH or another threshold. If the foreign object remains present, $Q_{defl}$ will remain at a value that exceeds the threshold, and additional measurements can be performed at block 114. If, however, the foreign object is removed, processing will return to block 100, so that wireless power transmitter 12 can determine whether a wireless power receiver 24 is present and, if so, can begin delivering wireless power to wireless power receiver 24.

In determining $Q_{defl}$, wireless power transmitter 12 can perform comparisons of measured Q to the baseline value of Q that was obtained during manufacturing and stored in wireless power transmitter 12 for future use. Temperature changes, frequency changes, coil resistance changes, and other changes can affect $Q_0$, so, if desired, $Q_0$ can be continually updated. With an illustrative arrangement, a filter is used in updating Q baseline based on a newly measured Q reading each time it is determined that there are no external objects present at the charging surface of wireless power transmitter 12. For example, each time wireless power transmitter 12 determines, during the operations of block 104, that $Q_{defl}$ is not greater than the threshold, wireless power transmitter 12 can conclude that there are no foreign objects and no wireless power transmitting devices present. Accordingly, wireless power transmitter 12 can conclude that the most recent measurement of Q from block 100 is, in effect, an updated open-air Q value that can be at least partly used in updating $Q_0$ (e.g., a current Q value that can be used as a filter input).

With this embodiment, an updated value of $Q_0$ can therefore be stored in wireless power transmitter 12 at point P1 of the flow chart of FIG. 7 each time it is determined that $Q_{defl}$ is not greater than threshold TH. In updating $Q_0$, the current value of Q (measured during the most recent visit to block 100) can be incorporated into $Q_0$ using a suitable filtering scheme (e.g., using a weighted historical average, using an averaging scheme that deemphasizes noisy data, or other filtering arrangement). By updating $Q_0$ with current measurement data in this way, the effects of aging on the baseline Q value can be reduced.

With an illustrative configuration, wireless power transmitter 12 can update $Q_0$ with the current value of measured Q using a low-pass filter. Let q[n] be a valid Q deflection sample. An example of a low-pass filter for Q is a one-pole filter (see, e.g., equation 11) in which $\alpha \in [0,1]$ and close to 1.

$$Q_{filt}[n] = \alpha Q_{filt}[n-1] + (1-\alpha)Q_{defl}[n],\ Q_{filt}[0] = 0 \tag{11}$$

Another example is the sliding window average given in equation 12.

$$Q_{filt}[n] = \begin{cases} \dfrac{\sum_{m=0}^{n} Q_{defl}[m]}{n} & \text{for } n < M \\ \dfrac{\sum_{m=n-M}^{n} Q_{defl}[m]}{M} & \text{for } N \geq M \end{cases} \tag{12}$$

As these examples demonstrate, there are multiple possible arrangements for incorporating current Q measurement data from block 100 into the baseline Q value that is retained in wireless power transmitter 12 and that is subsequently used in computing $Q_{defl}$. In these updating operations, control circuitry 16 can periodically update the baseline quality factor using a filtering operation based on a history of current quality factor measurements, thereby ensuring that the value of the baseline quality factor is adjusted for aging and other effects that could cause quality factor measurements to drift over time.

Updating the baseline Q value at point P1 can include performing a separate filtering operation following each measurement of Q at block 100. If desired, the number of filtering operations per unit time (and therefore the number of times that an updated value of Q baseline is computed and stored in device 12 per unit time) can be reduced by performing filtering operations at point P2 instead of P1. With this type of arrangement, the values of Q that are measured during the operations of block 100 can be stored (cached) by control circuitry 16 each time point P1 is reached (e.g., each time it is determined that no foreign object is present). If the operations of block 104 determine that the latest Q value exceeds threshold TH, processing can proceed to block 106 where a digital ping is performed. During the operations of block 108, control circuitry 16 can determine whether (a) no response has been received corresponding to the digital ping (in which case a foreign object is present, and processing proceeds to blocks 112); or whether (b) a wireless digital response has been received from device 24. At this point (e.g., at point P2), wireless power transmitter 12 can know that wireless power receiver 24 has just been placed on the charging surface of wireless power transmitter 12. Before initiating power delivery at block 110, wireless power transmitter 12 can retrieve the last value of Q that was cached at point P1 (and which represents a Q-factor measurement when no foreign object or other external object is present on device 12) and can use this retrieved current value of Q to update the value of Q baseline.

With this approach, the filtering operation used to update the value of Q baseline can be performed only upon determining that a wireless power receiver 24 is newly present (and no foreign object is present). The filtering operation can be performed using the most recently obtained value of Q when no external object was present (e.g., the no-external-object present value of Q that was cached at point P1). There is still a Q value storage operation each time point P1 is reached, but computation of the updated baseline Q value using the filter can be performed less frequently (e.g., only when P2 is reached). Updating the baseline Q value only when it has been determined that no wireless power receiving device is present and no foreign object is present ensures that the value of the baseline quality factor is adjusted for aging and other effects that could cause quality factor measurements to drift over time but do not involve as many separate filtering operations as when filtering operations are performed at point P1.

In addition to periodically updating the baseline value of Q (either at point P1 or at point P2, as examples), control circuitry 16 may periodically update the value of threshold TH that is used during the comparison operations of block 104 (e.g., an adjustable threshold value TH may be used rather than a fixed predetermined value). For example, a low pass filtering operation or other filtering operation may be used to update the value of TH based on a history of Q-factor measurements or other measurements (e.g., Q-factor measurements made when no external object is present and cached at point P1). This filtering operation to update the value of TH may be performed at point P2 (e.g., upon determining that no foreign object is present), using measurements such as one or more cached Q-factor measurements made when no wireless power receiving device or foreign object was present.

If desired, the value of $Q_{defl}$ may be compared to multiple different thresholds (e.g., to determine whether a small or large foreign object is present). Device 12 can then take different actions depending on whether a small or large foreign object is present. For example, wireless power can be transmitted at a restricted power level if a small foreign object is detected in the presence of a wireless power receiving device but can be forgone entirely in the presence of a large foreign object. In this context, small or large may refer to physical size and/or to other physical properties of the device that correlate to the level of heating that such a foreign object may be expected to undergo at various wireless power transfer levels.

Figure 8:
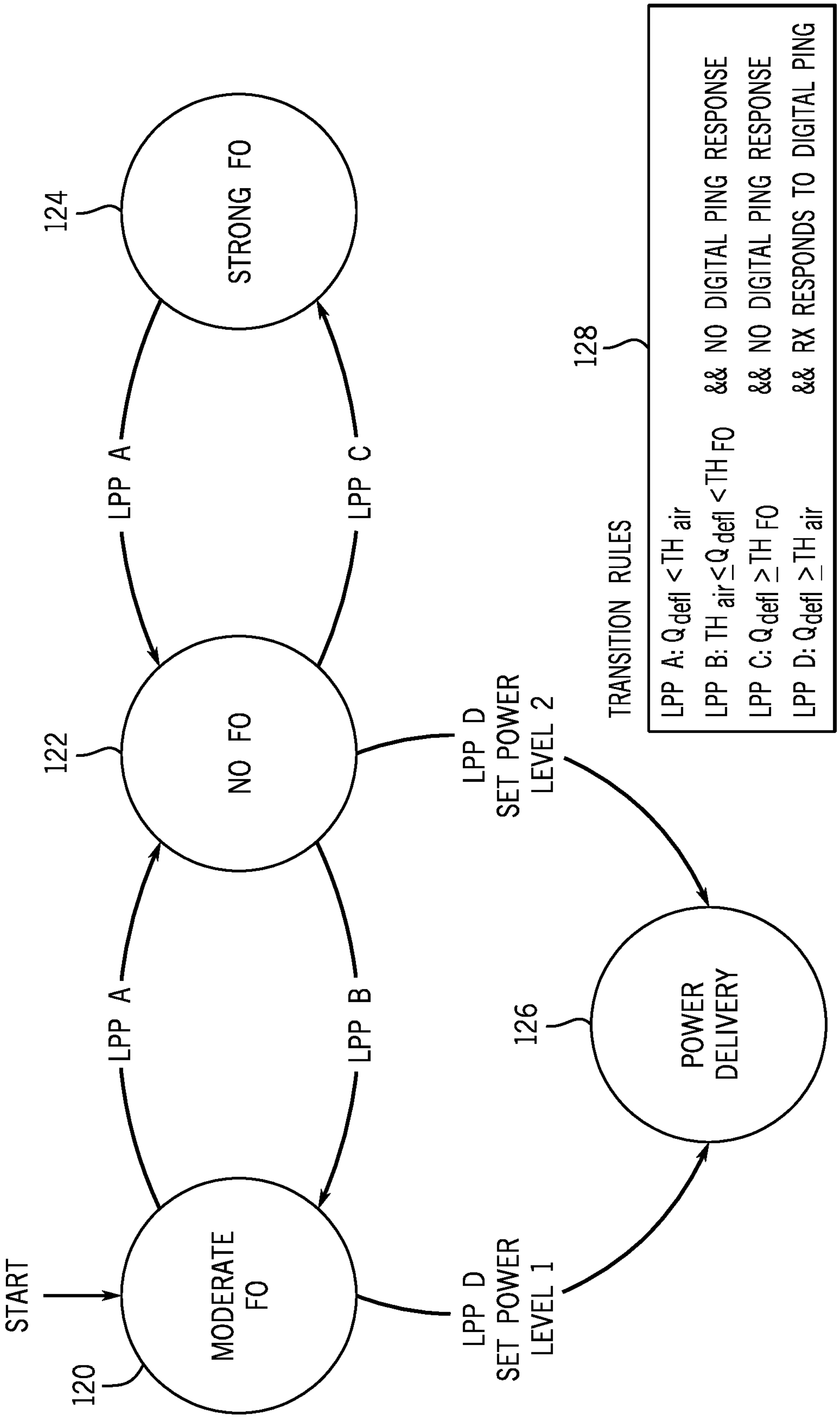

Consider, as an example, the diagram of FIG. 8, which illustrates the operation of wireless power transmitter 12 in a system with multiple foreign object detection thresholds. In the example of FIG. 8, wireless power transfer system 8 can have a lower first threshold $TH_{air}$ (e.g., 3% or any other suitable value such as a value less than 3% or a value greater than 3%) and a higher second threshold $TH_{FO}$ (e.g., 6%, a value above or below 6%, or any other suitable value higher than the first threshold). Wireless power transmitter 12 can operate in states 120, 122, 124, and 126. Transitions between these states can occur in accordance with transition rules 128. The values of thresholds $TH_{air}$ and $TH_{FO}$ can be adjusted appropriately to distinguish a moderate foreign object (e.g., an object with a relatively small amount of metal and/or metal of moderate conductivity) from a strong foreign object (e.g., an object with more metal and/or metal of greater conductivity). These "moderate" and "strong" foreign objects can correspond to the "small" and "large" foreign objects described above. Wireless power transfer can be inhibited in the case of a strong foreign object until free air is seen. However, by setting the threshold high enough, implementations can opt to avoid using the "strong foreign object" state.

As shown in FIG. 8, in block 122, wireless power transmitter 12 can compare $Q_{defl}$ to the first and second thresholds and can determine that $Q_{defl}$ is lower than the first threshold. In this scenario, wireless power transmitter 12 can conclude that no foreign object is present and can therefore set the power delivery level for wireless power signals 44 at a relatively higher power level (power level 2). Power can then be wirelessly transmitted from wireless power transmitter 12 to wireless power receiver 24 during the power delivery operations of block 126.

In block 120, it can have been determined that a foreign object is present because $Q_{defl}$ is greater than the first threshold. It also can have been determined that $Q_{defl}$ is less than the second threshold. As a result, wireless power transmitter 12 can conclude that although a foreign object is present, it is not a large or strong foreign object. Wireless power transmitter 12 can therefore proceed to deliver power wirelessly to wireless power receiver 24 during the operations of block 126. Because power is being delivered to wireless power receiver 24 in the presence of a small or moderate foreign object, the level at which power is wirelessly transmitted (i.e., the maximum power level) can be reduced to a relatively lower power level (e.g., power level 1, which is less than power level 2). This can help prevent or limit heating of the small/moderate foreign object. In block 124, it can detect that a large or strong foreign object is present, because $Q_{defl}$ is greater than the second threshold. In this situation, wireless power transmitter 12 can forego wireless power transfer.

The above-described embodiment is merely exemplary, and different control logic may be implemented, including multiple thresholds, multiple power levels, and variations in whether wireless power transfer is limited or completely inhibited in response to the respective thresholds. Additionally, further details of Q measurement techniques, compensation methods, accuracy improvement for such measurements, and the like are described in Applicant's U.S. patent application Ser. No. 18/327,721, entitled "Wireless Power Systems with Foreign Object Detection," filed Jun. 1, 2023 which is hereby incorporated by reference in its entirety.

As noted above, foreign object detection in a wireless power transfer system can also be based on mated-Q measurements, either separately from or in conjunction with open-air Q measurements as described above. At a high level, the operating principles of the mated-Q measurements are as described above. That is, when wireless power transmitter 12 is coupled to a wireless power receiver 24, the corresponding control circuitry 16, measurement circuitry 41, and power transmitting circuitry 52 can be configured to provide a signal that allows measurement of the coupled Q-factor (or other magnetic parameter(s), as described above). This signal can be in the form of an impulse response and ring-down as described above with respect to FIGS. 2-3. Additionally, or alternatively, this measurement can be based at least in part on a complex impedance measurement as described above with respect to FIGS. 4-5. The Q deflection or other magnetic parameter(s) thus obtained may be used in conjunction with a measurement of the system resonant frequency for foreign object detection. System resonant frequency may be derived from the impulse-based measurement of Q deflection performed as described with reference to FIGS. 2-3. More specifically, the resonant frequency is both a factor (along with Q-factor) that characterizes the ringdown envelope 94 and/or can be directly measured by reference to the ringing waveform. Alternatively, system resonant frequency may be determined by circuitry like that used for complex impedance measurement as described with reference to FIGS. 4-5, for example by sweeping the frequency of the applied waveform to identify a peak associated with the resonant frequency.

For a given wireless power transmitter 12, one or more baseline mated-Q and resonant frequency value pairs, each pair corresponding to one or more reference receivers 24, can be obtained, e.g., during the manufacture of the wireless power transmitter 12. Such one or more baseline mated-Q and resonant value pairs can be compared to mated-Q and resonant frequency measurements made during operation to detect a foreign object that may be brought into proximity with the wireless power transfer system 8 during operation. In some cases, the number of potential wireless power receivers 24 may be such that measuring and storing value pairs for each possible transmitter/receiver combination becomes unwieldy. In such cases, ecosystem scaling principles as described in greater detail below may be employed to make the situation more tractable by storing fewer baseline value pairs and providing a mechanism for the calculation of modified baseline value pairs corresponding to the particular transmitter receiver combination.

Figure 9:
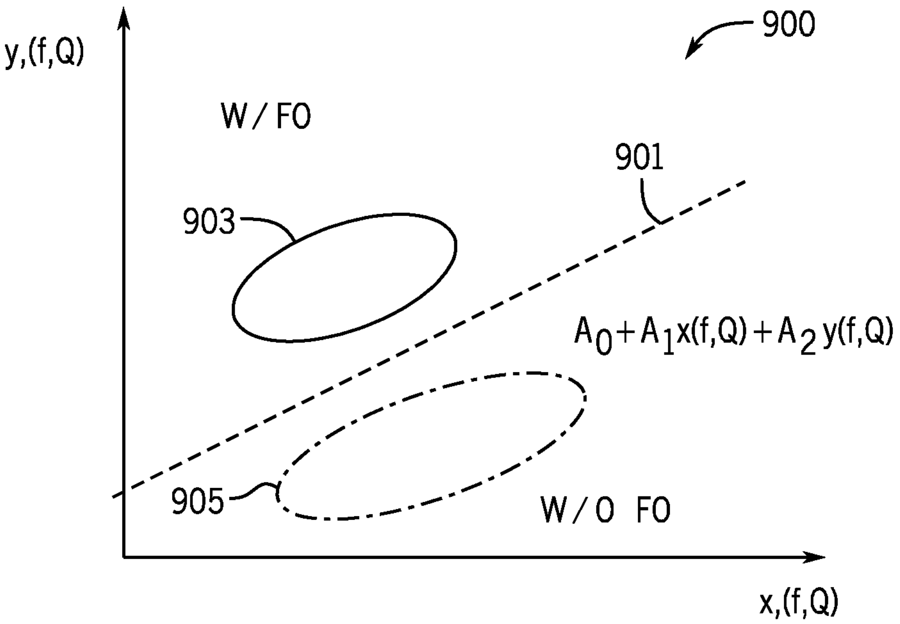
FIG. 9 illustrates principles relating to foreign object detection using a mated-Q and resonant frequency measurement.
Figure 17A:
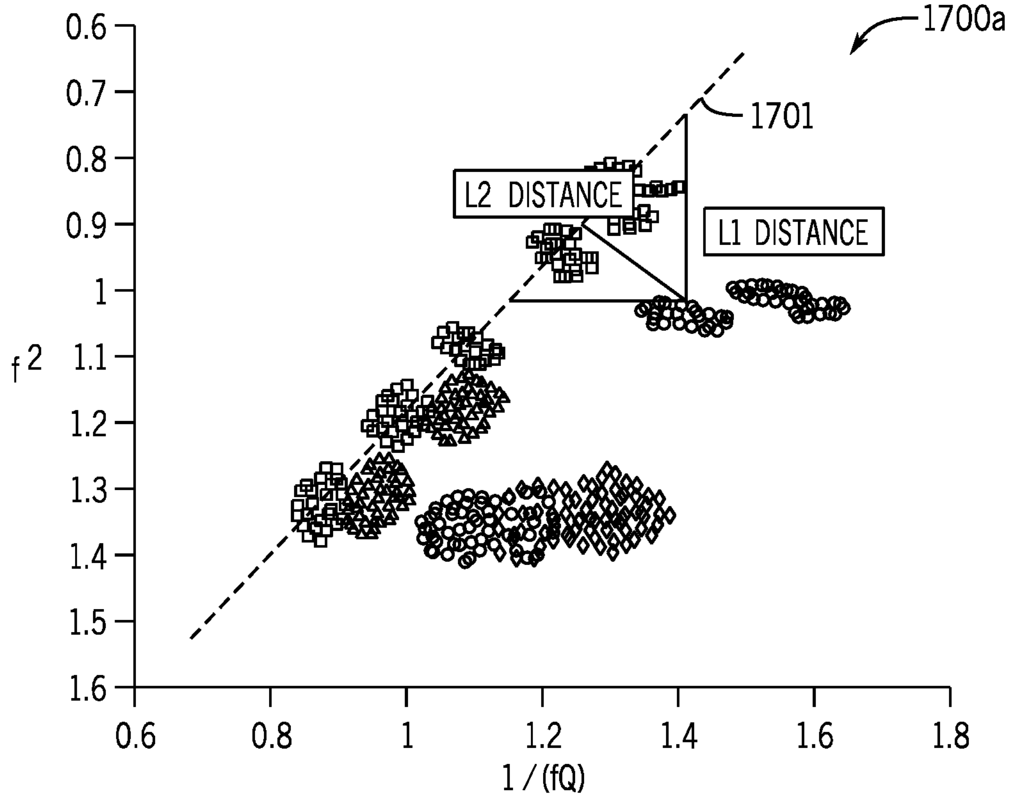
FIGS. 17A-17D illustrate alternative distance metrics for multi-dimensional mated-Q foreign object detection.

The baseline values or modified baseline values can be compared to the measured values in a two-dimensional space in which the presence and absence of a foreign object are sufficiently separated. Such a space may be thought of as a magnetic state space in which normal operation (in which no foreign object is present) and a scenario in which a foreign object is present and can be heated if undetected are sufficiently separated to be distinguishable. An example of such a space is depicted in FIG. 9 via plot 900. Plot 900 plots a first observable that is a function of resonant frequency and Q-factor (x(f,Q), e.g., measured resonant frequency deflection) on the x-axis versus a second observable that is a function of resonant frequency and Q-factor (y(f,Q), e.g., measured mated-Q deflection on the y-axis). Measured resonant frequency deflection can be the difference between a measured resonant frequency during operation and a baseline resonant frequency (optionally modified by ecosystem scaling computations as described in greater detail below). Measured mated-Q deflection can be the difference between a measured mated-Q value during operation and a baseline Q-factor (optionally modified by ecosystem scaling computations as described in greater detail below). When no foreign object is present, mated-Q and resonant frequency deflection values (or deflection of other magnetic parameters, as described above) will generally appear in area 905. When a foreign object is present, mated-Q and resonant frequency deflection values will generally appear in area 903. FIG. 9 is based on an fQ space. In an $f^2$, 1/fQ space, as described below with reference to FIG. 17A, the relative position between the areas corresponding to the presence or absence of a foreign object could be flipped. Thus, the relative position between these areas could be different depending on the functions chosen.

The separation between these two domains, i.e., no foreign object or foreign object present, can be delineated by a curve 901. Curve 901 may be a linear function of the form:

$$A_0 + A_1 f + A_2 Q = 0 \tag{13a}$$

where f and Q are the system resonant frequency and Q value and $A_0$, $A_1$, and $A_2$ are coefficients that can be extracted by suitable statistical techniques. For example, in at least some embodiments, logistic regression can be used. In a more general sense, resonant frequency f and quality factor Q can each be replaced with respective functions of f and Q. Equation 13a thus becomes:

$$A_0 + A_1 x(f, Q) + A_2 y(f, Q) \tag{13b}$$

where x(f,Q) is a first function of resonant frequency and quality factor and y(f,Q) is a second function of resonant frequency and quality factor. For example, x(f,Q) could be resonant frequency, f, and y(f,Q) could be quality factor, Q, which would yield equation 13a as provided above. Alternatively, as one exemplary embodiment, x(f,Q) could be $f^2$ (resonant frequency squared), and y(f,Q) could be $1/(f \cdot Q)$ (the inverse of resonant frequency times quality factor). As a result, the determination of whether a foreign object is present or not can be made by detecting a change in position of the first function-based and the second function-based measurements in a suitable state space.

Figure 10:
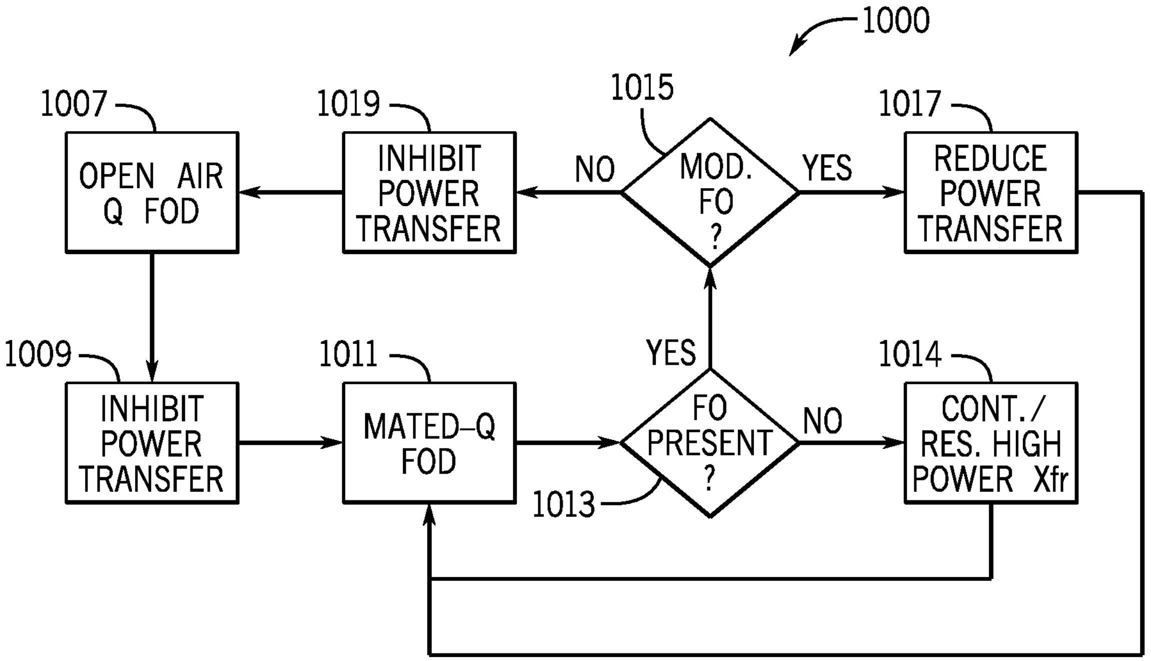
FIG. 10 illustrates a flow chart of a mated-Q foreign object detection method.

FIG. 10 illustrates a flow chart of a foreign object detection method 1000 employing mated-Q measurements as described above. Beginning with block 1007, the system can optionally perform an open-air Q-based foreign object detection routine, such as that described above. In response, the system may initiate power transfer (block 1009) at a suitable level, as was also described above. The exact operation of the open-air Q portion of mated-Q foreign object detected method 1000 can vary depending on the particular implementation and/or, in some embodiments, can be entirely omitted if desired. The mated-Q portion of foreign object detection method 1000 begins at block 1011, where mated-Q and resonant frequency are measured as described above. Then, in block 1013, the system (e.g., wireless power transmitter 12's control circuitry 16) can determine whether a foreign object is present by comparing the measured mated-Q and resonant frequency as described above. For example, processing circuitry can compare the measured mated-Q and resonant frequency values to reference values stored in the device and determine whether the associated deflection corresponds to area 905 (FIG. 9) of the magnetic state space (in which no foreign object is present) or area 903 (FIG. 9) (in which a foreign object is present). If it is determined that no foreign object is present, the process can pass to block 1014 allowing for the continuation or resumption of wireless power transfer at a relatively higher power level. Control can return to block 1011, allowing mated-Q and resonant frequency measurements to be made periodically at desired intervals during the power transfer operation initiated in block 1009, allowing for ongoing/continuous mated-Q foreign object detection.

Alternatively, if a foreign object is determined to be present in block 1013, the processing circuitry can determine whether the detected foreign object is a "moderate" or "small" foreign object or a "strong" or "large" foreign object as was described above. Additionally, more than two gradations of foreign object classification can be provided. In general, a moderate/small foreign object is one that can allow for wireless power transfer at a limited or lower power level without causing an elevated level of heating (e.g., above a threshold) of the foreign object. Likewise, a strong/large foreign object is one that may require the inhibition or suspension of wireless power transfer to prevent an elevated level of heating. What constitutes an elevated level of heating and therefore defines the classification of a foreign object as moderate/small or strong/large (or further gradations) can vary from one application or embodiment to the next. However, it may be desirable that the mated-Q and/or resonant frequency deflections be sufficiently different as between such classes to allow for ready analysis by the processing circuitry (e.g., control circuitry 16 of wireless power transmitter 12). Based on this classification, if the detected foreign object is determined in block 1015 to be a small/moderate foreign object, the power transfer level can be reduced in block 1017, and control can return to block 1011 allowing for continuous/periodic mated-Q foreign object detection. If the foreign object is subsequently removed, then power transfer can resume at the higher level (block 1014). Alternatively, if the foreign object remains, the flow will again proceed along the same 1015-1017-1011 path described above. As yet another alternative, if, in block 1015 it is determined that the detected foreign object is not a moderate/small foreign object and is therefore a strong/large foreign object, then control will proceed to block 1019, in which wireless power transfer is suspended or inhibited. Control then returns to block 1007 for resumption of power transfer once the open-air ping process determines that a foreign object is no longer present. If the open-air ping functionality 1007 is omitted from a particular embodiment or application, control can return to whatever path results in the initiation of wireless power transfer (e.g., block 1009).

The foregoing description is just one example of a mated-Q based foreign object detection and wireless power transfer control technique based thereon. Various modifications to such an arrangement are possible. For example, the classification of a detected foreign object as moderate/small or strong/large could be omitted entirely, and the detection of any foreign object in the mated-Q phase could result in suspension/inhibition of wireless power transfer. Similarly, there could be multiple classifications of foreign objects, each with a different reduced power limit. Also, as noted above, the initial open-air Q-measurement foreign object detection algorithm could be omitted or modified from the example described above. Numerous other variations and permutations are possible.

Figure 11:
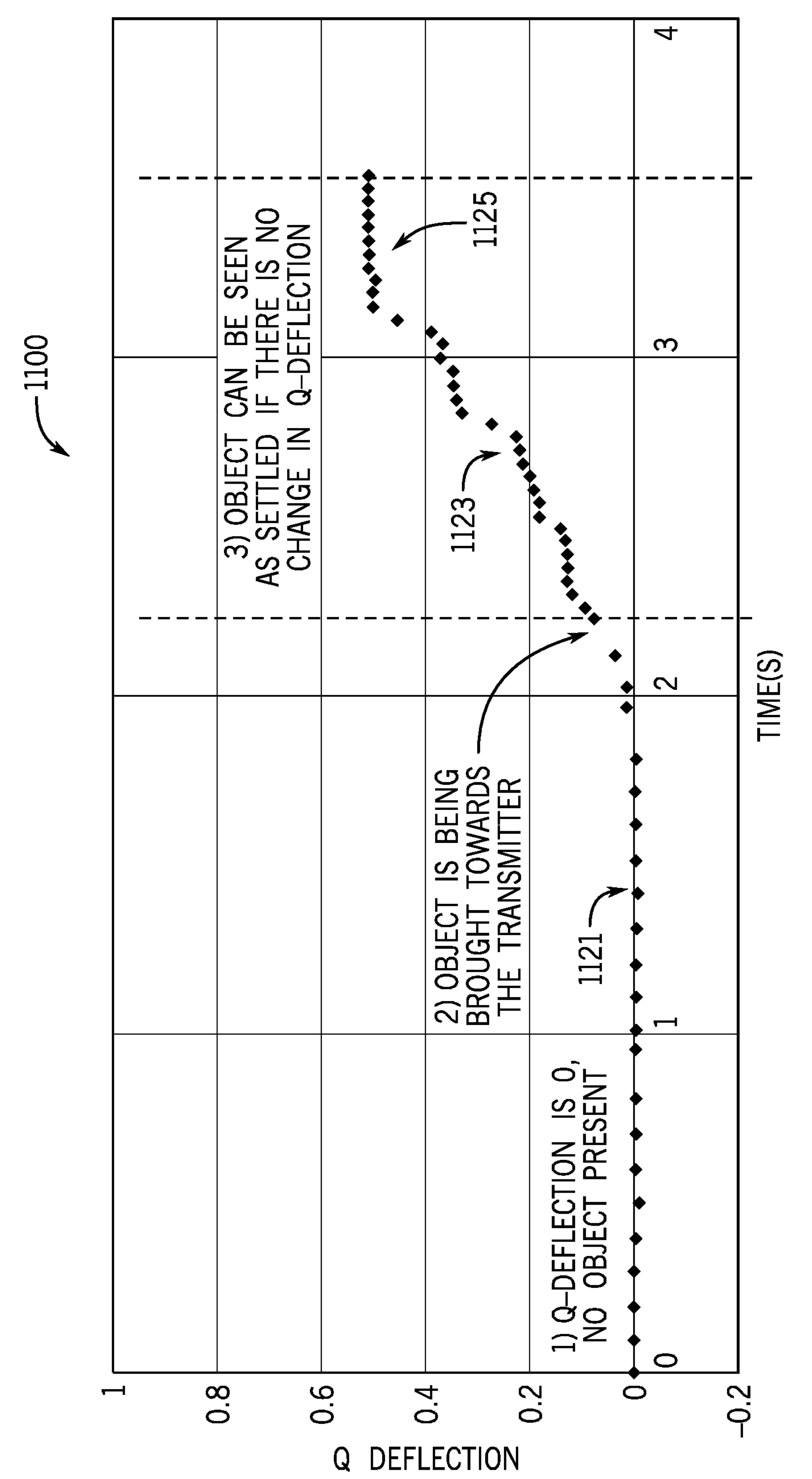
FIG. 11 illustrates a sequence of mated-Q measurements in the context of an object being brought in proximity to a mated wireless power transmitter/receiver pair.

FIG. 11 illustrates a sequence of mated-Q measurements associated with detecting settling/quiescent conditions that can be used for foreign object detection. The sequence is depicted as plot 1100 of measured mated-Q deflections (on the vertical axis) versus time (on the horizontal axis), in which each mated-Q measurement is a point. The mated-Q deflection is the difference between the measured mated-Q value at that instant and the reference mated-Q value stored in a device, e.g., a wireless power transmitter 12. The initial reference value may be programmed into the unit at manufacture and may be periodically updated as described elsewhere herein.

An initial sequence 1121 of Q deflection values of zero corresponds to the situation in which no object, either foreign object or wireless power receiver is present. These intervals may provide an opportunity to update the stored reference values as described elsewhere herein. Beginning at about 2 seconds in the exemplary plot 1100, the Q-deflection value begins increasing but does not have a steady value over a sequence of samples 1123. This corresponds to the time that an object, which can be a wireless power receiver or a foreign object, is being brought into proximity with the transmitter. During this interval, it may be desirable for the processing system, e.g., control circuitry 16 or wireless power transmitter 12 to do nothing until the Q-deflection readings stabilize. Nonetheless, in some situations, for example very large Q-deflections, it may be desirable to more quickly take action to reduce or inhibit power transfer. In either case, the processing circuitry can apply suitable averaging or filtering to the Q-deflection values to determine whether the system has reached a stable steady state point. Such a steady state can be indicated when a sequence of the measured Q-deflection values exhibits no change, as with samples 1125. Samples 1125 indicate that the system has stabilized with a Q-deflection value of about 0.5 (although other Q-values are equally possible). This stabilized Q-deflection value (and its associated resonant frequency value)

can then be used to perform the mated-Q foreign object detection as described above. In some cases, the sequence of mated-Q measurements (rather than deflection), the resonant frequency measurements, or the resonant frequency deflection can be used to detect whether the system has reached a steady operating state as an object is brought into proximity. In fact, in some applications, the resonant frequency measurements and/or resonant frequency deflection may provide a better estimate of when the system has stabilized than the mated-Q value/deflection samples.

As noted above, use of mated-Q measurements for foreign object detection may rely on baseline mated-Q and resonant frequency measurements that may be different for each possible wireless power transmitter and wireless power receiver pair. In some cases, multiple such baseline values can be determined, e.g., at manufacture, and stored in a wireless power transmitter as described above. However, as the number of potential transmitter receiver pairs becomes larger, this may quickly become impracticable. Thus, it may be desired to provide for each transmitter one or more baseline value pairs based on one or more "reference" or "golden" receiver pairings. Then, each receiver can be characterized relative to one or more of the reference/golden receivers and can be provided with its own stored values corresponding to such characterization. For example, this could be implemented as a variety of scaling factors relative to the reference/golden receiver(s). Then, a wireless power receiver could provide its scale factors to the wireless power transmitter, which could then calculate appropriate baseline mated-Q and resonant frequency values based on the stored reference values and the scaling factors. Exemplary techniques for loss measurement scaling are described in Applicant's U.S. patent application Ser. No. 17/681,363, entitled "Wireless Power Systems with Shared Inducive Loss Scaling Factors," filed Feb. 25, 2022, which is incorporated by reference herein in its entirety and is summarized below with reference to FIGS. 2, 12 and 13.

As described above, FIG. 2 shows illustrative wireless power circuitry in wireless power transfer system 8 in an illustrative scenario in which a wireless power transmitter has been paired with a wireless power receiver. The wireless power circuitry of FIG. 2 includes wireless power transmitting circuitry 52 in wireless power transmitter 12 and wireless power receiving circuitry 54 in wireless power receiver 24. During operation, wireless power signals 44 are transmitted by wireless power transmitting circuitry 52 and are received by wireless power receiving circuitry 54. The configuration of FIG. 2 includes a single transmitting coil 36 and a single receiving coil 48 (as an example).

As shown in FIG. 2, wireless power transmitting circuitry 52 can include inverter circuitry 61. Inverter circuitry (inverter) 61 may be used to provide signals to coil 36. During wireless power transmission, the control circuitry of wireless power transmitter 12 can supply signals to control input 82 of inverter 61 that can cause inverter 61 to supply alternating-current drive signals to coil 36. Circuit components such as capacitor 70 may be coupled in series with coil 36 as shown in FIG. 2. Measurement circuitry 41 in wireless power transmitter 12 may make measurements on operating currents and voltages in wireless power transmitter 12. For example, voltage sensor 41A may be used to measure the coil voltage across coil 36 and current sensor 41B may be used to measure the coil current through coil 36. In other implementations, voltage across capacitor 70 can be measured and current through the coil is inferred from that measurement.

When alternating-current current signals are supplied to coil 36, corresponding alternating-current electromagnetic signals (wireless power signals 44) can be transmitted to nearby coils such as illustrative coil 48 in wireless power receiving circuitry 54. This can induce a corresponding alternating-current (AC) current signal in coil 48. Capacitors such as capacitors 72 may be coupled in series with coil 48. Rectifier 50 can receive the AC current from coil 48 and can produce corresponding direct-current power (e.g., direct-current voltage $V_{rect}$) at output terminals 76. This power may be used to power a load. Measurement circuitry 43 in device 24 may make measurements on operating currents and voltages in device 24. For example, voltage sensor 43A may measure $V_{rect}$ (the output voltage of rectifier 50) or a voltage sensor may measure the coil voltage on coil 48. Current sensor 43B may measure the rectifier output current of rectifier 50 or a current sensor may measure the current ω of coil 48.

The measurements made by measurement circuitry 41 and 43 may be processed to extract magnetic loss properties (e.g., coefficients or other parameters that characterize the amount of power losses in wireless power transmitter 12 and wireless power receiver 24 and that are dependent on the magnetic properties of the transmitter and receiver). These measurements may be stored within each device and may be exchanged between devices so that wireless power transmitter 12 (and, if desired, wireless power receiver 24) may use this information in accurately estimating any foreign object power loss that might be present and/or other related parameters, such as a mated-Q measurement and/or mated resonant frequency measurement.

If desired, these measurements may be used to estimate how well transmitter and receiver are able to transfer wireless power. For example, these measurements may be used to estimate a magnetic coupling coefficient K, wireless power transfer efficiency, estimated foreign object power loss, and/or other attributes of the mated transmitter receiver pair. In addition to or instead of estimating foreign object power loss to determine whether a foreign object is present and therefore whether to proceed with wireless power transfer, the system may use this information (e.g., estimated foreign object power loss and/or related coupling and/or efficiency information) to determine whether to present the user of the system with a confirmatory message to inform a user that wireless power transmission is proceeding properly (e.g., to inform the user that this process has not been thwarted by the presence of poor coupling due to presence of a foreign object, possible misalignment, or other factors). Exemplary confirmatory messages include audio output such as a chime and/or visual output presented on wireless power receiver 24.

In general, any suitable information may be exchanged between devices in system 8 and this information may be used in any suitable way. The exchange of measurements such as those made using measurement circuitry 41 and 43 and the use of this information in determining whether a foreign object is present is illustrative.

Following measurements with circuitry 41 and 43, the amount of power potentially absorbed by a foreign object in system 10 may be determined using equation 14.

$$P_{FO} = P_{OUT} - P_{IN} - P_{LOSSTX} - P_{LOSSRX} \tag{14}$$

In equation 14, $P_{FO}$ represents the amount of power absorbed by a foreign object that is present (if any). $P_{OUT}$ represents output power (e.g., the output power of rectifier 50), $P_{IN}$ represents input power (e.g., the input power to coil 36), $P_{LOSSTX}$ represents power loss attributable to wireless power transmitter 12, and $P_{LOSSRX}$ represents power loss attributable to wireless power receiver 24. The values of $P_{OUT}$ and $P_{IN}$ may be measured (e.g., using circuitry 41 and 43). Mathematical models may be used to produce functional expressions for $P_{LOSSTX}$ and $P_{LOSSRX}$ and these expressions can be evaluated using measured operating parameters such as the measurements made using circuitry 41 and 43. For example, with one illustrative modeling embodiment, $P_{LOSSTX}$ and $P_{LOSSRX}$ can be computed using equations 15a and 16a, respectively.

$$P_{LOSSTX} = b \cdot R_{AIRTX} \cdot (I_{TX})^2 \quad (15a)$$

$$P_{LOSSRX} = m \cdot R_{AIRRX} \cdot (I_{RX})^2 + \alpha \cdot (I_{RX})^2 + \alpha_{DC} \quad (16a)$$

In equations 15a and 16a, $I_{TX}$ represents transmitter current (e.g., coil current) and $I_{RX}$ represents receiver current (e.g., rectifier output current or, in some embodiments, receiver coil current). The values of $R_{AIRTX}$ and $R_{AIRRX}$ represent measured AC coil resistances for coils 36 and 48 respectively. The values of b, m, $\alpha$, and $\alpha_{DC}$ are model parameters (sometimes referred to as magnetic power loss coefficients) that characterize the performance of the coupled wireless power transmitter and wireless power receiver pair in wireless power transfer system 8. Transmitter power loss $P_{LOSSTX}$ is solely due to transmitter coil power loss in the model of equation 15a. Receiver power loss $P_{LOSSRX}$ has a first component that is due to receiver coil power losses (the first term of equation 16a) and has a second component (made up of the last two terms in equation 16a) that represents friendly metal losses (e.g., losses due to eddy currents induced in the receiver when power is being transferred). Parameter b may sometimes be referred to as a transmitter coil loss parameter or coefficient. Parameter m may sometimes be referred to as a receiver coil loss parameter or coefficient, and parameters $\alpha$ and $\alpha_{DC}$ may sometimes be referred to as friendly metal loss parameters or friendly metal loss coefficients. Parameters b, m, $\alpha$, and $\alpha_{DC}$ depend on the magnetic interactions between wireless power transmitter 12 and wireless power receiver 24 when coupled and may therefore sometimes be referred to as magnetic loss parameters or magnetic loss coefficients.

In an ecosystem in which there are multiple different models of wireless power transmitting device available to a user (e.g., different models of wireless power transmitter 12) and multiple different models of wireless power receiving device 24 (e.g., different models of either device), the magnetic loss parameters can vary as a function of which particular wireless power transmitter and wireless power receiver are paired together. If, as an example, a model I transmitter and model J receiver are paired, the amount of power loss in each device will differ from that experienced when these devices are paired with different devices.

To account for these variations and thereby ensure accurate estimation of foreign object power loss in equation 14, magnetic power loss parameter scaling factors (sometimes referred to as magnetic power loss coefficient scaling factors) can be used. In particular, the models of $P_{LOSSTX}$ and $P_{LOSSRX}$ of equations 15a and 16a, which may be inaccurate in ecosystems with multiple different transmitter and receiver models, may be replaced by equations 15b and 16b, respectively.

$$P_{LOSSTX} = g_b \cdot b_R \cdot R_{AIRTX} \cdot (I_{TX})^2 \quad (15b)$$

$$P_{LOSSRX} = g_m \cdot m_R \cdot R_{AIRRX} \cdot (I_{RX})^2 + g_\alpha \cdot \alpha_R \cdot (I_{RX})^2 + g_\alpha \cdot \alpha_R \cdot (I_{RX})^2 + g_{\alpha DC} \cdot \alpha_{RDC} \quad (16b)$$

In equation 15b, the transmitter coil loss parameter b from equation 15a has been replaced by a reference transmitter coil loss value $b_R$ (sometimes referred to as a transmitter coil loss coefficient) that is associated with the transmitter loss measured when a reference transmitter is coupled to a reference receiver. This value can then be scaled using the scaling factor $g_b$. In equation 16b, the receiver coil loss parameter m can be replaced with $m_R$ (sometimes referred to as a receiver coil loss coefficient), which is associated with the receiver coil loss measured when a reference receiver and transmitter are coupled. This value can then be scaled using the scaling factor $g_m$. In equation 16b, the friendly metal loss parameters $\alpha$ and $\alpha_{DC}$ can be respectively replaced with reference friendly metal loss parameters (coefficients) $\alpha_R$ and $\alpha_{RD}$C extracted using measurements made with a reference transmitter and reference receiver. The reference friendly metal loss parameters can be scaled by respective scaling factors $g_\alpha$ and $g_{\alpha DC}$. By using scaling factors in computing $P_{LOSSTX}$ (see, e.g., equation 15b) and $P_{LOSSRX}$ (see, e.g., equation 16b), equation 14 can be satisfactorily evaluated regardless of which models of transmitter and receiver are paired with each other.

Figure 12:
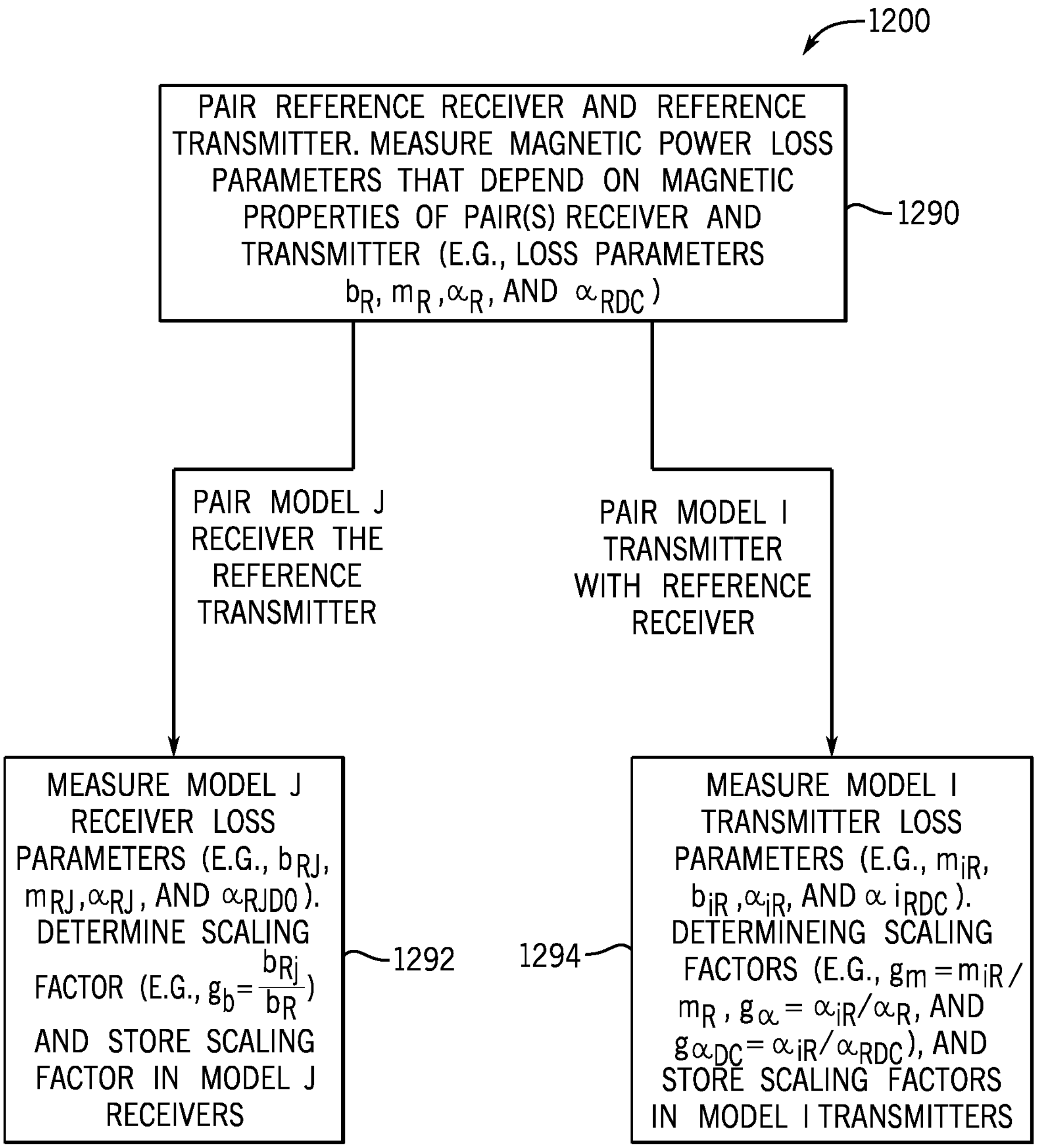
FIGS. 12 and 13 illustrate flow charts of wireless power transfer device parameter scaling operations.
Figure 13:
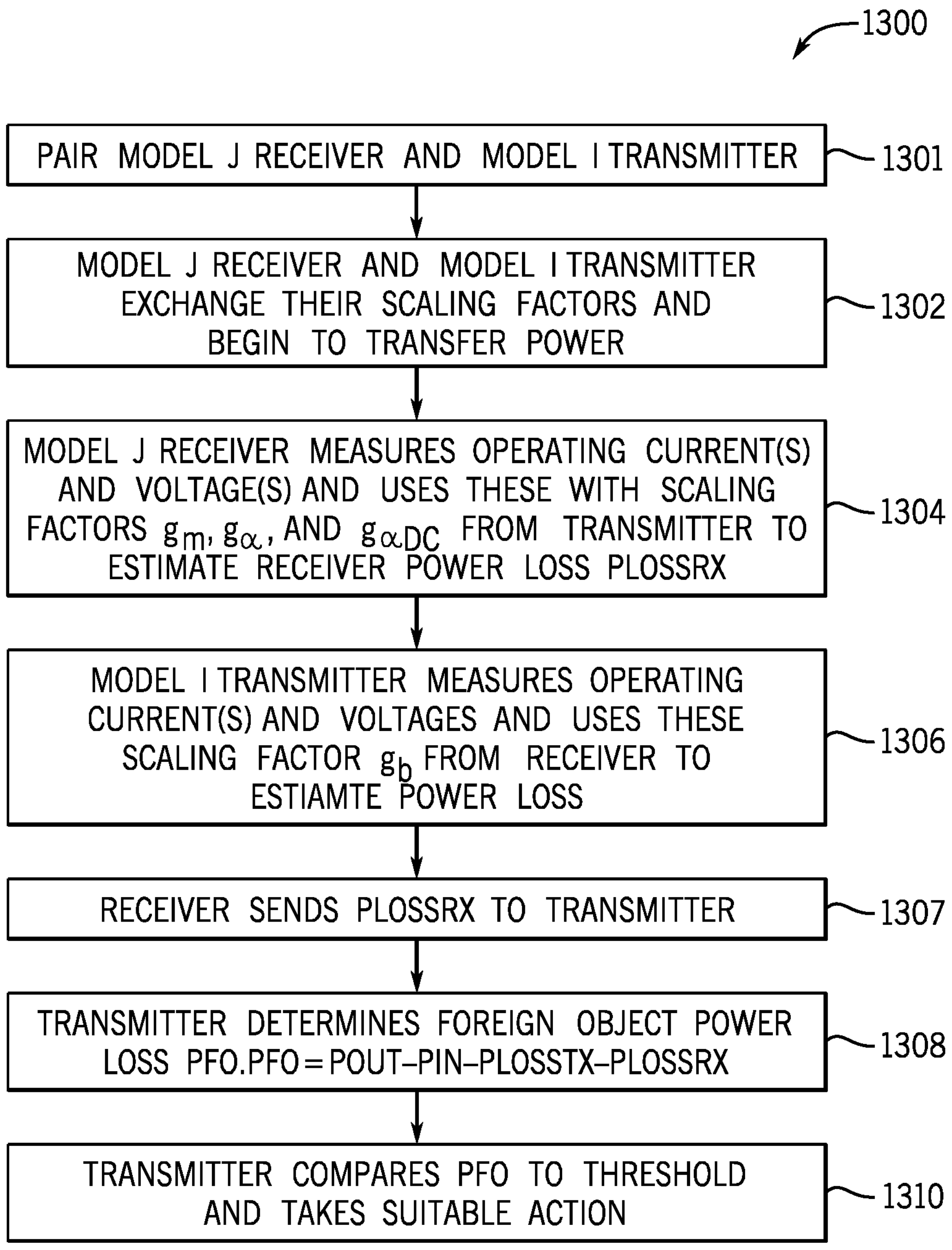

Illustrative operations involved in using measuring transmitters and receivers to determine their scaling parameters are shown in the flow chart 1200 of FIG. 12. Operations in FIG. 12 can be performed at design time, and the resulting scaling factors can be stored in production units. Illustrative operations involved in using the scaling parameters in wireless power transfer system 8 are shown in FIG. 13. Operations in FIG. 13 can be performed at runtime (e.g., when transmitter and receiver are paired in preparation for transmitting wireless power between transmitter and receiver). In the examples of FIGS. 12 and 13, it can be assumed that the scaling factors for a particular model of transmitter (e.g., a model I transmitter) and a particular model of receiver (e.g., a model J receiver) have been obtained using reference device measurements and then subsequently used when a model I transmitter is paired with a model J receiver. In general, this process can be expected to be performed for numerous models of transmitter (e.g., models other than model I) and for numerous models of receiver (e.g., models other than model J). Moreover, any of the various models of transmitter that have been characterized may, in general, be paired by a user with any of the various models of receiver that have been characterized. This is because not all users own the same model of transmitter and not all users own the same model of receiver. In the present example, an illustrative user pairs a model I transmitter with a model J receiver during the operations of FIG. 13.

Operations involved in measuring magnetic power loss parameter scaling factors for a model I transmitter and model J receiver are shown in FIG. 12. During the operations of block 1290, a reference wireless power receiver is paired (physically or via a simulated pairing such as a finite element analysis simulation pairing) with a reference wireless power transmitter. Physical reference devices may be obtained from a centralized source or may be constructed by different device manufacturers in accordance with a universally distributed reference design. Once paired, the reference wireless power transmitter and reference wireless power receiver may begin transferring power. In particular, during the operations of block 1290 the reference wireless power transmitter may send wireless power signals to the reference wireless power receiver while internal operating parameters (e.g., transmitter and receiver currents and voltages) are measured and stored. From these measurements, the reference magnetic loss parameters can be extracted (e.g., the values of reference magnetic loss parameters $b_R$, $m_R$, $\alpha_R$, and $\alpha_{RDC}$ can be obtained). In scenarios in which pairing simulations are used in place of measurements on physically paired devices, finite element analysis simulation can be used to determine the LQK (inductance, Q-factor, and coupling coefficient) of the coupled transmitter receiver pair, and then circuit simulations can be used to determine the expected currents and voltages. These simulated currents and voltages can then be used to determine the magnetic loss parameters.

After the reference magnetic loss parameters have been determined (either by physical measurements or simulations), a model J receiver can be paired with a reference wireless power transmitter. While these devices are paired in a simulation or while these devices are physically paired and wireless power is being transferred from the reference wireless power transmitter to the model J receiver, loss parameter measurements for the model J receiver may be obtained. In particular, during the operations of block 1292, the model J loss parameters (coefficients) $b_{RJ}$, $m_{RJ}$, $\alpha_{RJ}$, and $\alpha_{RJDC}$ can be obtained. The "J" in each of these parameters and the R (for "reference") in each of these parameters indicates that the loss parameters are specific to a scenario in which a model J receiver is operating with a reference wireless power transmitter. The scaling factor $g_b$ (equation 15b) for the model J receiver can then be computed using equation 17 (below) and stored in all model J wireless power receiving devices (e.g., during manufacturing or later using an update).

$$g_b = b_{RJ}/b_R \tag{17}$$

During the operations of block 1294, a model I transmitter can be paired with a reference wireless power receiver. Power can be transmitted wirelessly while wireless power transmitter operating parameters (e.g., currents and voltages) are measured. From these measurements or simulations, magnetic loss parameters $m_{IR}$, $b_{IR}$, $\alpha_{IR}$, and $\alpha_{IRDC}$ can be obtained for the model I transmitter. Using equations 18, 19, and 20, the scaling factors $g_m$, $g_\alpha$, and $g_{\alpha DC}$ for the model I transmitter can then be calculated.

$$g_m = m_{IR}/m_R \tag{18}$$

$$g_\alpha = \alpha_{IR}/\alpha_R \tag{19}$$

$$g_{\alpha DC} = \alpha_{IRDC}/\alpha_{RDC} \tag{20}$$

The scaling factors for the model I transmitter can then be stored in all model I transmitters (e.g., during manufacturing or later using an update).

Illustrative operations involved in using the scaling factors for a model I transmitter and a model J receiver in a scenario in which a model I transmitter and model J receiver are paired by a user are shown in the flow chart of FIG. 13. During the operations of FIG. 13, a user with a model J receiver and a model I transmitter who wishes to wirelessly transfer power from the model I transmitter to the model J pairs the model I transmitter and model J receiver during the operations of block 1301 (e.g., by magnetically coupling a model I wireless power transmitter (e.g., a wireless charging puck, as just one example) to a model J wireless power receiver (e.g., a cellular telephone, as just one example). During the operations of block 1302, the model I transmitter and model J receiver can exchange information such as their pre-programmed scaling factors (e.g., using low-power in-band communications or other wireless communications) and begin to transfer power. For example, the model J receiver can send the value of scaling factor $g_m$ that was obtained from the model J measurements with the reference transmitter at block 1292 of FIG. 12 to the model I transmitter. The model I transmitter can send the values of scaling factors $g_m$, $g_\alpha$, and $g_{\alpha DC}$ that were obtained from the model I measurements with the reference receiver at block 1294 of FIG. 12 to the model J receiver. While wirelessly transferring power from the model I transmitter to the model J receiver, measurement circuitry 41 in the wireless power transmitter and measurement circuitry 43 in the wireless power receiver can measure the operating parameters of the transmitter and receiver (e.g., coil currents and voltages, rectifier output voltage and current, etc.). Current and voltage measurements may, if desired, be exchanged between wireless power transmitter and wireless power receiver (e.g., using in-band wireless communications). The information that is measured with circuitry 41 and 43 can be used in conjunction with the exchanged scaling factors to compute $P_{LOSSRX}$ and $P_{LOSSTX}$ using equations 15b and 16b.

During the operations of block 1304, for example, the model J receiver can measure rectifier current and rectifier voltage (the product of which is $P_{OUT}$) and can use the measurements in conjunction with the scaling factors $g_m$, $g_\alpha$, and $g_{\alpha DC}$ that were received from the model I transmitter during the operations of block 1202 to evaluate equation 16b and thereby estimate $P_{LOSSRX}$. The scaling factors received from the model I transmitter can provide information to receiver J on the expected operating characteristics of the model I transmitter with respect to receiver coil loss and friendly metal loss.

As an example, consider receiver coil loss. If receiver J were to be paired with a reference wireless power transmitter, the value of scaling factor $g_m$ would be one. The receiver J could then use the first term in equation 16b to determine the receiver coil loss (the receiver coil loss being $m_R \cdot R_{AIRRX} \cdot (I_{RX})^2$, where the values of $m_R$, $R_{AIRRX}$, and receiver current $I_{RX}$ are known to the receiver J. In the present situation, however, receiver J is not paired with a reference wireless power transmitter but is instead paired with transmitter I. Transmitter I might previously have been determined to induce lower coil losses in mated receivers than the reference transmitter, so the value of $g_m$ that transmitter I passed to the model J receiver during block 1302 may be 0.9 (as an example). When the model J receiver evaluates equation 16b using the received scaling factor value of 0.9 from the model I transmitter, the model J receiver will accurately estimate a somewhat reduced value of $P_{LOSSRX}$ (due to the presence of the model I transmitter, which is known to induce lower amounts of receiver coil loss than the reference wireless power transmitter). As this example demonstrates, by using scaling factors received from the model I transmitter, the magnetic loss parameters that the receiver J uses to compute $P_{LOSSRX}$ can be scaled appropriately to reflect that a model I transmitter is present instead of a reference wireless power transmitter, thereby enhancing the accuracy with which the value of $P_{LOSSRX}$ can be estimated.

During the operations of block 1306, the model I transmitter can use measurements of measured transmitter coil current $I_{TX}$, the known values of $b_R$ and $R_{AIRTX}$, and the scaling factor $g_b$ received from the wireless power receiver in evaluating equation 15b to estimate $P_{LOSSTX}$. The scaling factor $g_b$ is a reflection of how receivers of model J are expected to affect transmitter coil loss in transmitters that are paired with model J receivers instead of a reference wireless power receiver. As an example, model J receivers may tend to cause paired transmitters to exhibit more transmitter coil loss than a reference wireless power receiver. As a result, the value of scaling factor $g_b$ that the model I transmitter receives from the model J receiver may be 1.1 (as an example). When evaluating equation 15b, this elevated scaling factor will help the transmitter I account for the fact that the model I transmitter is coupled to a model J receiver and should therefore expect larger transmitter coil losses than if coupled to a reference wireless power receiver.

During the operations of block 1307, the value of $P_{LOSSRX}$ that is computed at block 1304 may be sent to the paired transmitter. During the operations of block 1308, wireless power transfer system 8 (e.g., wireless power transmitter 12 and/or associated control circuitry 16) can evaluate the value of $P_{FO}$ using equation 14 (e.g., an estimate can be made of foreign object power loss, if any). By accurately estimating $P_{LOSSTX}$ using the scaling factor information received from the model J receiver and by receiving the estimated value of $P_{LOSSRX}$ from the model J receiver, the model I transmitter can have both $P_{LOSSTX}$ and $P_{LOSSRX}$ for equation 14. The value of $P_{IN}$ may be obtained by the wireless power transmitter by computing the product of the transmitter coil current ($I_{TX}$) and voltage from measurement circuitry 41. The value of $P_{OUT}$ may be obtained by the wireless power transmitter by computing the product of the rectifier output current $I_{RX}$ and rectifier output voltage received from measurement circuitry 43 or receiving $P_{OUT}$ from the wireless power receiver.

After determining the value of $P_{FO}$ during the operations of block 1308, the transmitter may compare $P_{FO}$ to a threshold power loss value (TH). Suitable action may then be taken by wireless power transfer system 8. For example, in response to determining that $P_{FO}$ is less than TH, it can be concluded that no foreign object is present and power transfer operations may be allowed to proceed normally (e.g., so that power can be transferred to charge battery 58). In response to determining that $P_{FO}$ is greater than TH, power transfer operations may be restricted. Examples of power transfer restrictions that may be implemented include forgoing all power transfer operations (i.e., inhibiting wireless power transfer) and/or halting power transfer if already in progress, limiting the maximum amount of power that may be transferred (e.g., to a predetermined relatively low power level below the normal maximum power transfer capabilities of the wireless power transfer system), and/or issuing a visual, audible, and/or vibrational alert to a user. If desired, alerts for a user (e.g., warnings and/or other informational content informing the user that power transfer operations are not proceeding normally because a foreign object has been detected) may be presented using output devices in wireless power transmitter 12 and/or in wireless power receiver 24. For example, control circuitry in wireless power transmitter 12 may wirelessly communicate with control circuitry in wireless power receiver 24 to issue a visual alert that is presented on a display in wireless power receiver 24.

The above-described exchange of scaling parameters between various wireless power transfer devices may be thought of as providing for "ecosystem scaling" in that it expands the "ecosystem" of devices that can cooperate to provide wireless power transfer and foreign object detection. Such ecosystem scaling can be extended to the context of mated-Q foreign object detection as was described above.

Figure 14:
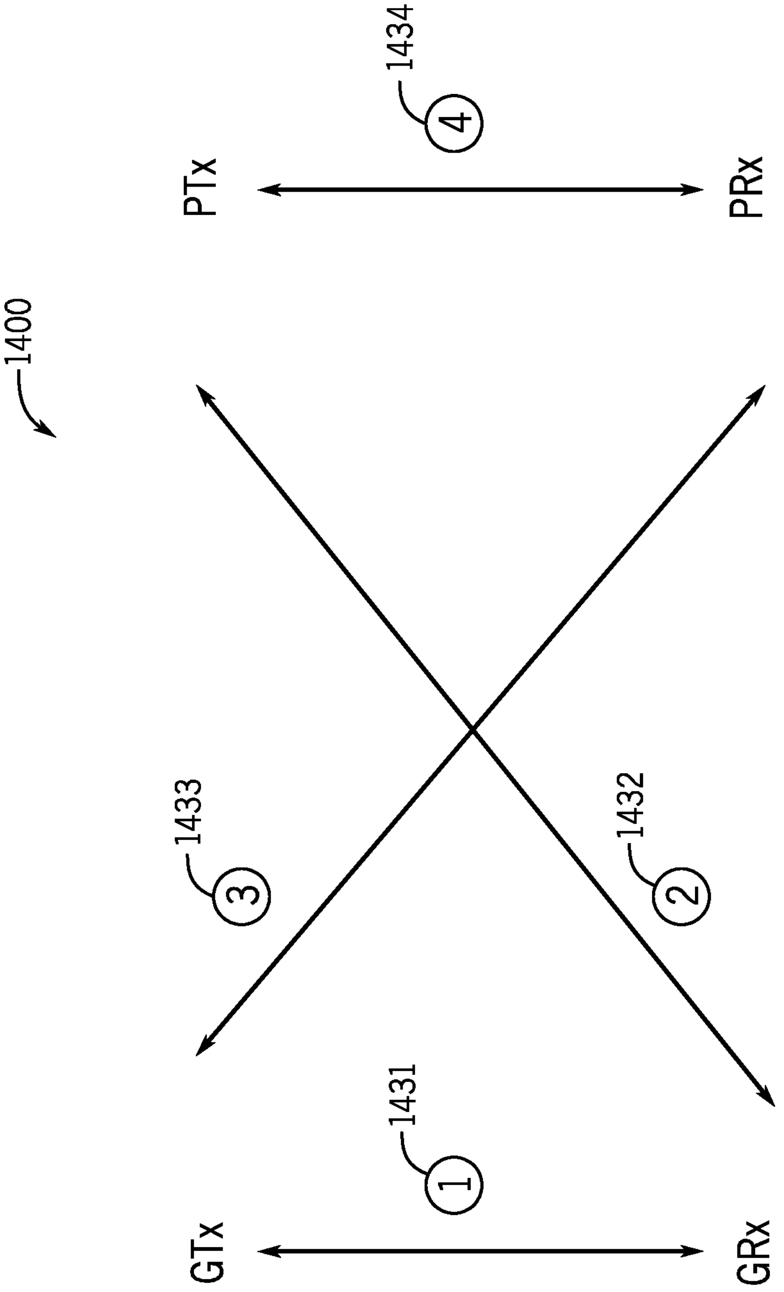
FIG. 14 illustrates a process for scaling mated-Q and resonant frequency parameters.

The basic procedure to perform ecosystem scaling for mated-Q involves four steps 1431-1434 illustrated in FIG. 14. (As used in the specification, "step" merely refers to respective operations performed and is not intended to invoke a "step-plus-function" interpretation of any claims referencing elements of steps 1431-1434 unless "step for xyz" language is expressly used in such claims.) Steps 1431-1433 involve extraction of new coefficients. In Step 1 (1431): a Golden (Reference) Wireless Power Transmitter (denoted GTx) can be mated with a Golden (reference) Wireless Power Receiver (denoted GRx, and the mated-Q threshold (e.g., line 901, FIG. 9) can be extracted:

$$A_{0,gg} + A_{1,gg}x(f, Q) + A_{2,gg}y(f, Q) = 0 \tag{21}$$

The extracted threshold coefficients $A_{0,gg}$; $A_{1,gg}$, $A_{2,gg}$ can be stored in the GTx firmware. In Step 2 (1432): a new wireless power transmitter (denoted PTx) can be mated with GRx and the threshold can be extracted:

$$A_{0,tg} + A_{1,tg}x(f, Q) + A_{2,tg}y(f, Q) = 0 \tag{22}$$

The threshold coefficients $A_{0,tg}$; $A_{1,tg}$, $A_{2,tg}$ can be stored in the PTx firmware.

In Step 3 (1433): a new wireless power receiver (denoted PRx) can be mated with GTx and the threshold can be extracted:

$$A_{0,gr} + A_{1,gr}x(f, Q) + A_{2,gr}y(f, Q) = 0 \tag{23}$$

Here, an additional step can be performed to extract the "scaling" of the threshold coefficients:

$$g_0 = A_{0,gr} - A_{0,gg} \tag{24}$$

$$g_1 = \frac{A_{1,gr}}{A_{1,gg}} \tag{25}$$

$$g_2 = \frac{A_{2,gr}}{A_{2,gg}} \tag{26}$$

The coefficients $g_0$, $g_1$, $g_2$ are the "scaling coefficients" and can be stored in the PRx firmware. It is worth noting that, while $g_1$ and $g_2$ are defined as a ratio between the threshold coefficients in Step 3 and Step 1, the scaling of the DC term $g_0$ is defined as a difference. The reason for this will be explained below.

Step 4 (1434): up to this point, both the new PTx and PRx possess a set of coefficients in their respective firmware. The threshold coefficients $A_{0,tg}$, $A_{1,tg}$, $A_{2,tg}$ are stored in the PTx, and the scaling coefficients $g_0$, $g_1$, $g_2$ are stored in the PRx. When PTx and PRx meet in the field, the new detection threshold can be defined as follows:

$$(g_0 + A_{0,tg}) + g_1 A_{1,tg} x(f, Q) + g_2 A_{2,tg} y(f, Q) = 0 \tag{27}$$

The technique described above can eliminate the need to extract new threshold coefficients for each PTx and PRx combination. Instead, the new coefficients stem from the previous coefficients extracted against a "Golden" or reference pair.

As described above, mated-Q technique(s) can be used to detect foreign objects (FOs) in the vicinity of a wireless power transfer system (that includes a wireless power transmitter and a wireless power receiver). The physical quantities, for example, resonance frequency (f), quality factor (Q), and coupling coefficient (K) of the mated system (PTx coupled to PRx), can be measured with a low power ping (LPP), for example as described above with respect to FIG. 7. Foreign objects can be detected in an f-Q space, i.e., a space with resonance frequency on one axis and quality factor on another axis. One approach can be to use a linear threshold to separate the two classes: without FO (Rx only or Rx with case or cover) and with FO (both with and without case or cover). (As described herein, "case," "cover", and "case/cover" refers to an object that is associated with the PRx device, for example, as a case or cover used in connection with a mobile phone. To acquire the threshold, a linear classifier can be trained with a given dataset using a linear support vector machine (SVM). Other classifier implementations could also be used, and the trained classifier can be implemented using the hardware described above with respect to FIG. 1, potentially along with suitable software running on that hardware. However, due to the non-linear alignment of the clusters, formed by PRx at different locations (characterized by R and z), the linear classifier may be less ideal in certain scenarios. Multiple linear thresholds can be used to create a more effective separation, known as the split threshold approach, as illustrated in FIG. 15.

Figure 15:
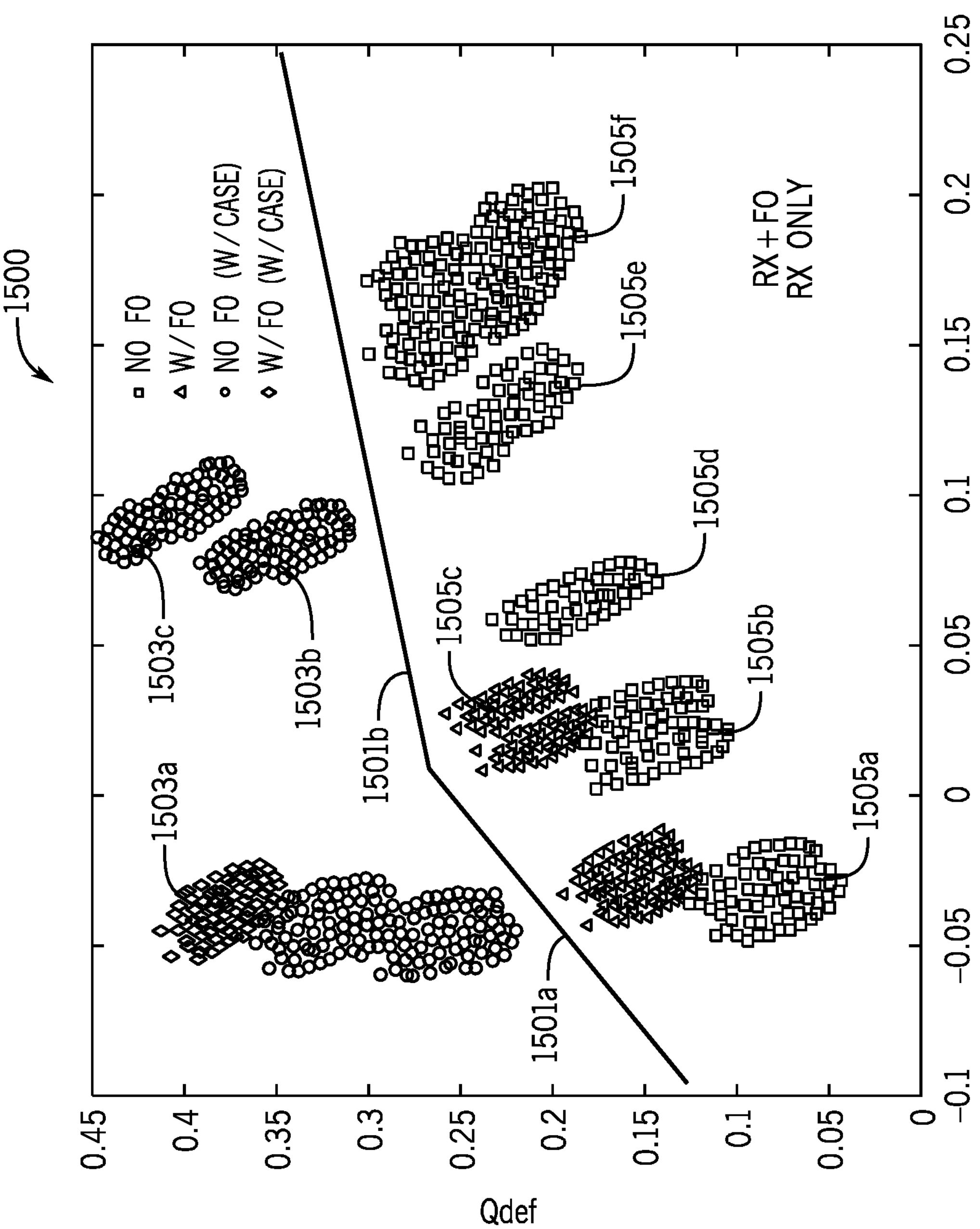
FIG. 15 illustrates a variable threshold for mated-Q foreign object detection.

More specifically, FIG. 15 illustrates various clusters of frequency deflection versus Q deflection measurements. Parameters other than frequency deflection and Q deflection can be used, and thus the axes can correspond to various functions of f and Q, as was introduced above with respect to FIG. 9. Such changes are described in greater detail below. Nonetheless, in the example of FIG. 15, clusters 1505*a*-1505*f* correspond to different scenarios or configurations in which only a receiver is present. Clusters 1503*a*-1503*c* correspond to different scenarios or configurations in which a foreign object is present. Curve 1501*a*-1501*b* depicts a multiple linear threshold curve as described in the preceding paragraph. This generally corresponds to the arrangement described above beginning with reference to FIG. 9.

One potential downside of a multi-threshold system can be an increased number of parameters required to describe the split threshold(s). The non-linear separation may also pose challenges to ecosystem scaling (e.g., because thresholds can depend on the training state space). To address these challenges, an approach described below based on a reduced state space (Rx only, i.e., no foreign object) while improving the classification accuracy can be used. The technique can employ mapping the physical quantities: resonant frequency f, quality factor Q, and coupling coefficient K, into a different space where the Rx-only clusters naturally align with each other. The parameters for the line (representing the Rx-only cluster) can be calculated by linear regression. When a foreign object is coupled to the mated system, the data depart from this line, and thus, can be detected. A clear separation of the four categories: Rx only, Rx+case/cover, Rx+FO, Rx+FO+case/cover can be demonstrated by taking the distance to that line. Because the classifier does not require training with the foreign object data, it can work for any foreign objects (ferrous and non-ferrous) so long as there is separation when the foreign object is placed within the detection limit (e.g., within 23-24 mm for some applications).

To map the physical quantities f, Q, and K into new observables which show linear dependency, we need to model the theoretical correlation between them. The mated resonance frequency is given by the condition where the system demonstrates zero imaginary input impedance from the Tx, $\mathrm{Im}(Z_{in})=0$. The input impedance is given by the Tx's impedance, $Z_{Tx}$, and the reflected impedance from Rx, $Z_{ref}$:

$$Z_{in} = Z_{Tx} + Z_{ref} \tag{28}$$

The Tx impedance, $Z_{Tx}$, is $$Z_{Tx} = R'_{Tx} + j\omega L_{Tx} + \frac{1}{j\omega C_{Tx}} \tag{29}$$

where $R'_{Tx}=R'_{Tx}+R_{dson1}+R_{dson2}+R_{dcm1b}$. The reflected impedance by Rx, $Z_{ref}$, is $$Z_{ref} = \frac{-Z_m^2}{Z_{Rx}} \tag{30}$$

where $$Z_m = R_M + j\omega L_M \tag{31}$$

$$R_M = K_r\sqrt{R_{Tx}R_{Rx}} \tag{32}$$

$$L_M = K_i\sqrt{L_{Tx}L_{Rx}} \tag{33}$$

$$Z_{Rx} = R_{Rx} + j\omega L_{Rx} + \frac{1}{j\omega C_{tot}} \tag{34}$$

Combining Eq. (28)-(34), the imaginary input impedance, $\mathrm{Im}(Z_{in})$, can be calculated as:

$$\mathrm{Im}(Z_{in}) = \frac{(\omega^2 L_M^2 - R_M^2)\omega C_{tot}(1-\omega^2 L_{Rx}C_{tot}) - 2\omega^3 L_M C_{tot}^2 R_M R_{Rx}}{(1-\omega^2 L_{Rx}C_{tot})^2 + \omega^2 C_{tot}^2 R_{Rx}^2} + \omega L_{Tx} - \frac{1}{\omega C_{Tx}} \tag{35}$$

To simplify the calculation, observe that ω can be in the range of ten to the power of 6, $C_{tot}$ can be in the range of ten to the power of −9, $L_M$ can be in the range of ten to the power of −5, $R_M$, $R_{Rx}$ can be in the range of ten to the power of 0. Then the imaginary part of input impedance can be simplified as:

$$\mathrm{Im}(Z_{in}) = \omega^3 L_M^2 C_{tot} + \omega L_{Tx} - \frac{1}{\omega C_{Tx}} \tag{36}$$

Given the condition that $\mathrm{Im}(Z_{in})=0$, at the mated resonance frequency, $\omega_{mated}$ can be solved as:

$$\omega_{mated} = \sqrt{\frac{-1 + \sqrt{1 + 4K_i^2 L_{Rx} C_{tot} \omega_{Tx}^2}}{2K_i^2 L_{Rx} C_{tot}}} \tag{37}$$

where the coupling coefficient $K_i$ is defined as:

$$K_i = \frac{L_M}{\sqrt{L_{Tx} L_{Rx}}} \tag{38}$$

And the self-resonant frequency of Tx is defined as:

$$\omega_{Tx} = \frac{1}{\sqrt{L_{Tx} C_{Tx}}} \tag{39}$$

The ratio between $\omega_{mated}$ and $\omega_{Tx}$ can be found by:

$$\frac{\omega_{mated}}{\omega_{Tx}} = \sqrt{\frac{-1 + \sqrt{1 + 2x}}{x}} \tag{40}$$

where $$x = 2K_i^2 L_{Rx} C_{tot}.$$

Based on the range of values, x is the range of ten to the power of −2. Using Taylor Series Expansion at x=0, it can be simplified as:

$$\frac{\omega_{mated}}{\omega_{Tx}} \approx 1 - \frac{x}{4} \tag{41}$$

Therefore $\omega_{mated}$ is slightly lower than $\omega_{Tx}$.

Then, define the mated inductance $L_{mated}$ as:

$$L_{mated} = \frac{1}{\omega_{mated}^2 C_{Tx}} = \frac{1}{4\pi^2 f_{mated}^2 C_{Tx}} \tag{42}$$

Based on (39) and (42), $$L_{mated} \approx L_{Tx} \tag{43}$$

Therefore, $$K_i^2 \approx \frac{L_M}{L_{mated} L_{Rx}} = \frac{4\pi^2 L_M C_{Tx}}{L_{Rx}} f_{mated}^2 \tag{44}$$

Additionally, the quality factor of the mated system is:

$$Q_{mated} = \frac{2\pi f_{mated} L_{mated}}{R_{mated}} \tag{45}$$

where $R_{mated}$ are the mated resistance.

$$R_{mated} = \frac{1}{2\pi C_{Tx}} \cdot \frac{1}{f_{mated} Q_{mated}} \tag{46}$$

Alternatively, $R_{mated}$ is given by the real part of the input impedance, $\mathrm{Re}(Z_{in})$, evaluated at $\omega_{mated}$. According to Eq. (1-1)-(1-7), we can get:

$$Re(Z_{in}) = \frac{(\omega^2 L_M^2 - R_M^2)\omega^2 C_{tot}^2 R_{Rx} + 2\omega^2 L_M C_{tot} R_M (1 - \omega^2 L_{Rx} C_{tot})}{(1 - \omega^2 L_{Rx} C_{tot})^2 + \omega^2 C_{tot}^2 R_{Rx}^2} + R'_{Tx} \tag{47}$$

With similar assumptions used for $\mathrm{Im}(Z_{in})$, at mated frequency, it can be simplified as:

$$Re(Z_{in})_{mated} = R'_{Tx} + 8\pi^2 C_{tot} L_M R_M f_{mated}^2 \tag{48}$$

Thus, according to Eq. (44), (46) and (48), $$K_i^2, f_{mated}^2$$

and $1/(f_{mated} Q_{mated})$ show linear dependency for the mated system.

As described above, because of the linear dependency, we can choose $$f_{mated}^2,$$

$1/(f_{mated} Q_{mated})$, and $K^2$ to transform the fQK space for foreign object detection. In practice, to reduce the influence of the part-to-part variation, we use $$f_{def}^2, 1/(f_{def} Q_{def}), K_{def}^2,$$

as our observables, where:

$$f_{def} = f_{meas}/f_{cal}, \tag{49}$$

$$Q_{def} = Q_{meas}/Q_{cal}. \tag{50}$$

$$K_{def} = K_{meas}/K_{cal}. \tag{51}$$

In Eqs. (49)-(51), "meas" represents the measured quantities at run time (based on actual Tx to Rx coupling), and "cal" represents the calibration of the Tx module in the factory/at manufacture (this value can be stored in a memory of the transmitter device as described above). Using such a calibration can reduce the influence of part-by-part variation caused by manufacturing tolerances, etc.

Figure 16A:
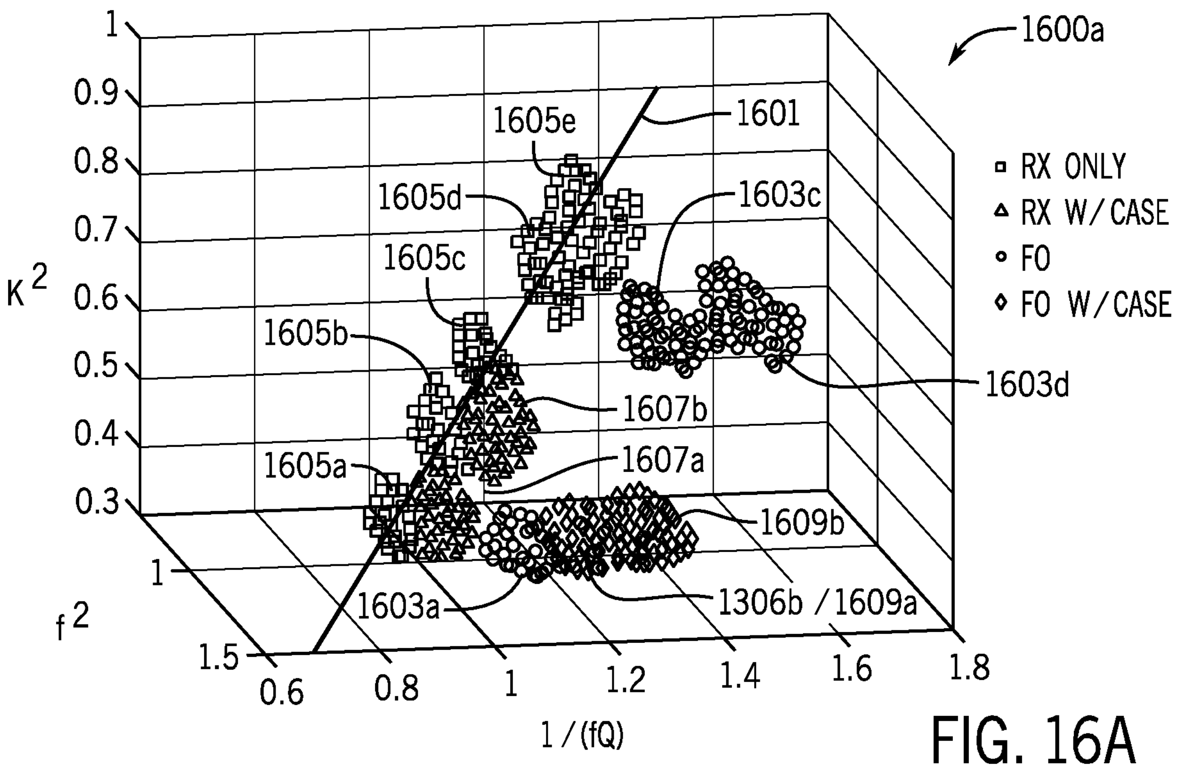
FIGS. 16A-16B illustrate a multi-dimensional mated-Q state space to derive a linear threshold line for foreign object detection.
Figure 16B:
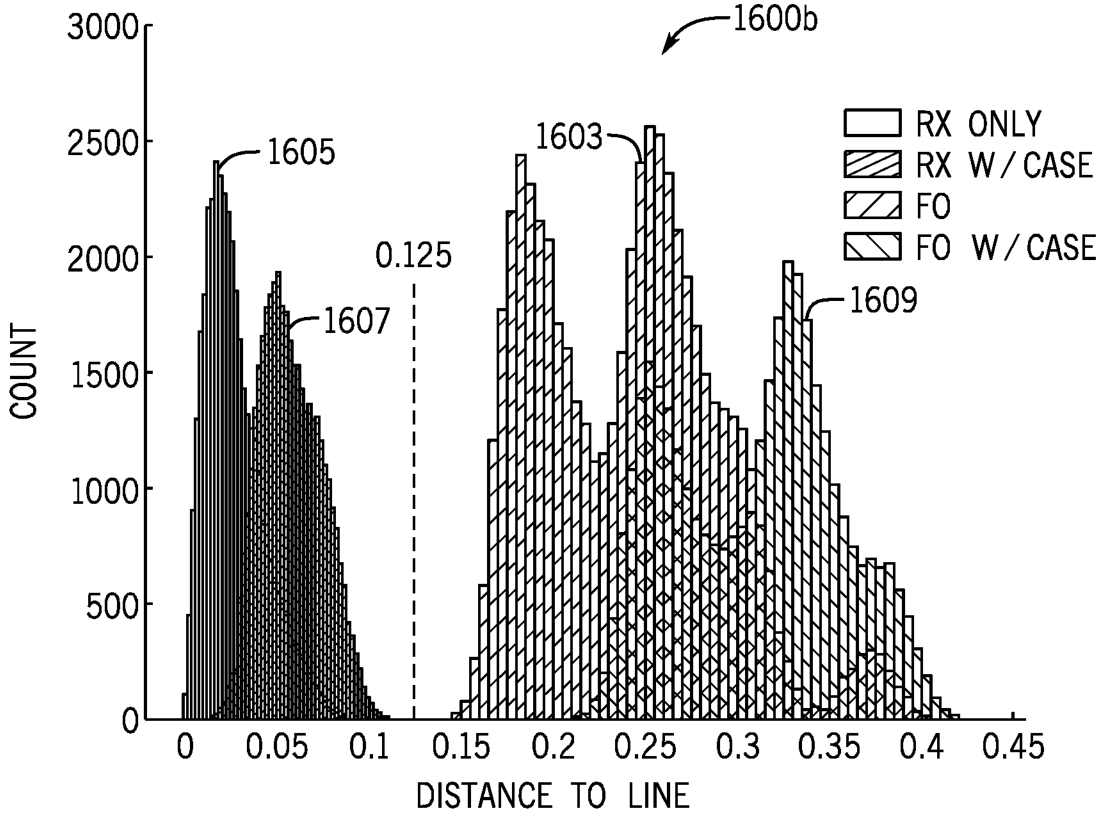

With reference to plot 1600*a* of FIG. 16A, by fitting the Rx-only clusters 1605*a*-1605*e* using linear regression (line 1601), the L2 distance of various measured points in the other clusters 1603*a*-1603*c* (foreign object), 1607*a*-1607*b* (receiver and case/cover), and 1609*a*-1609*b* (receiver, case/cover, and foreign object) to the line in the transformed fQK space can be indicative of the presence of a receiver only, a receiver and case/cover, a receiver and a foreign object, or a receiver, case/cover, and foreign object. (Note that cluster 1603*b*, corresponding to measurements associated with the presence a receiver and a foreign object, and cluster 1609*a*, corresponding to measurements associated with the presence of a receiver, a case/cover, and a foreign object, overlap in the illustrated example, although this may not be the case in all instances. As illustrated in the histogram plot 1600*b* of FIG. 16B, the categories of Rx-only (1605), Rx+case/cover (1607), Rx+FO (1603), and Rx+FO+case/cover (1609) can be separated based on the L2 distance from regression line 1601. In the illustrated example, a threshold of 0.125 for the L2 distance can be used to effectively separate the non-foreign object cases from the foreign object cases. In the illustrated example, there is overlap between the case/cover absent and case/cover present measurements, although this does not affect the determination of whether a foreign object is present. Additionally, the specific threshold value given above is exemplary only. Depending on the specific physical properties and configurations of a given implementation, a different threshold value may be required. This threshold (or any appropriate threshold based on the particulars of a given application, can be programmed into a classifier implemented using any suitable combination of hardware and software as described above.

Such a classifier can have at least two advantages: (1) It does not require training with the FO data. Once the distribution of the first two categories (Rx-only 1605 and Rx+case/cover 1607), the foreign object detection threshold can be set by their maximum distance to the line. Anything beyond the threshold will be considered with FO. Therefore, the technique can run for any type of FO. (2) Such a classifier can be insensitive to the state space. Because the clusters in the Rx-only category (1605*a*-1605*e*) are aligned, the linear regression converges to a fixed value as long as the state space is large enough.

In practice, each cluster can have some volume in the transformed fQK space. As the FO radius (defined as the distance between FO center and Tx center) increases, the latter two categories (Rx+FO and Rx+FO+case/cover) may eventually intersect with the first two categories (Rx only and Rx+case/cover). The maximum FO radius without an intersection can be defined as the detection limit. In an exemplary embodiment, the detection limit may be between 23 mm and 24 mm. Please note that the detection limit is not the same as the critical radius. The detection limit is the FO distance at which a FO can reliably be detected. The critical radius is given by the tolerance of the FO temperature elevation, and thus will increase with the delivered power level. Thus, it may be preferable that the detection limit be larger than the critical radius.

Figure 17B:
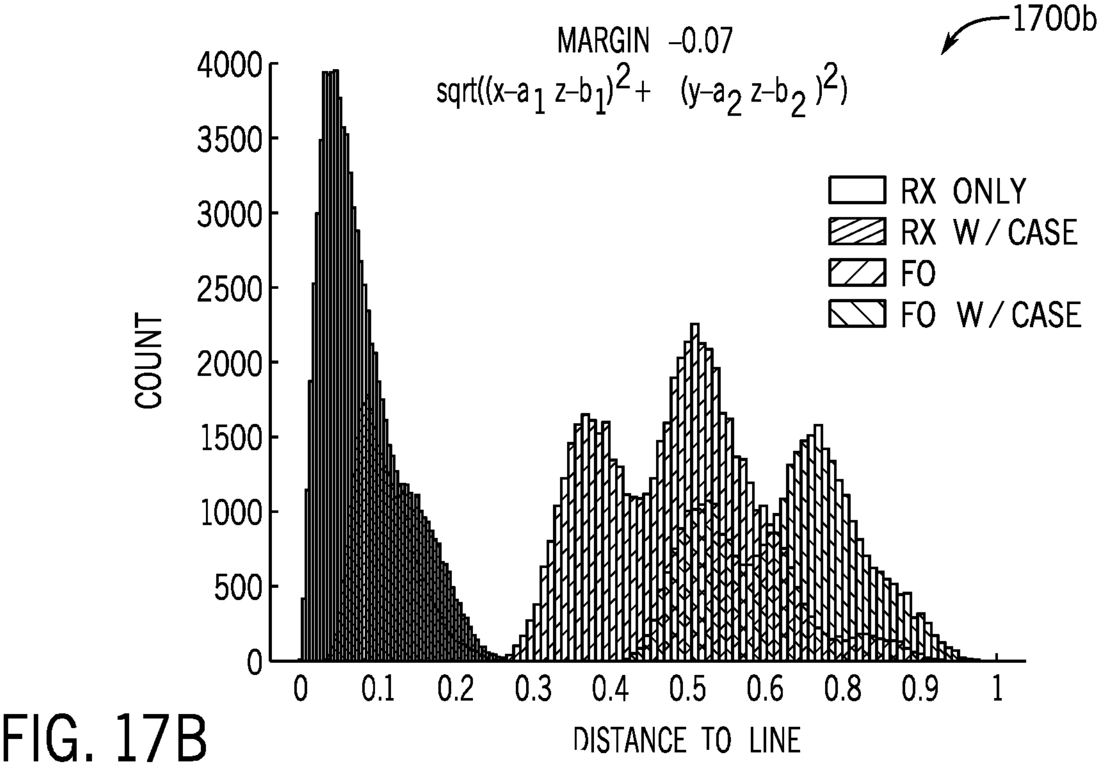
Figure 17C:
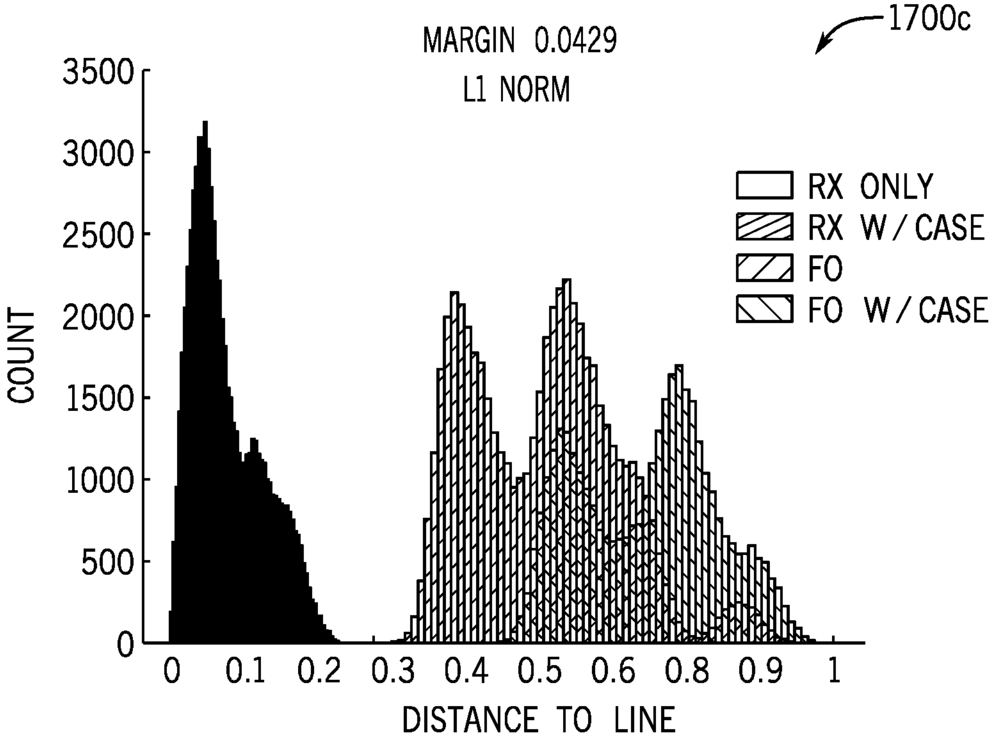
Figure 17D:
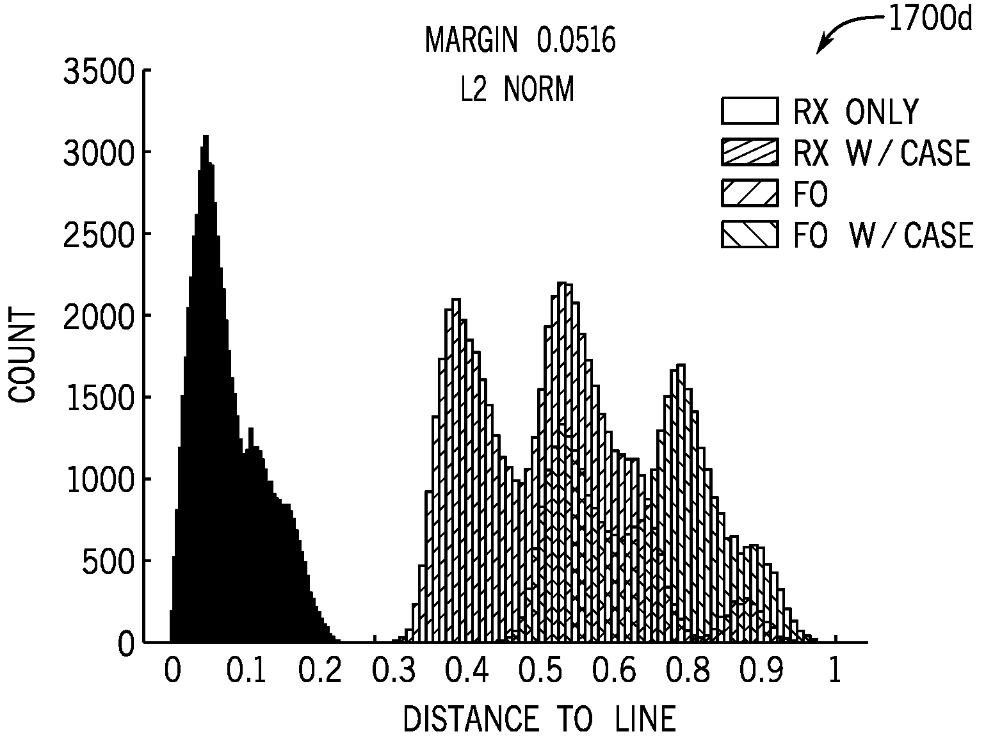

The measurement of the distance between a data point and the linear regression line can be optimized to increase the margin between the with foreign object and without foreign object categories. Specifically, as shown in plot 1700*a* of FIG. 17A, we can choose the L1 distance, i.e., the sum of the distance to the regression line 1701 in the x, y, and z directions, or the L2 distance, i.e., the closest distance to the line, for the measurement. These distances are exemplary, and other distance measurements may also be used. As illustrated in histogram plot 1700*b* of FIG. 17B, the L2 distance may yield little margin between the with foreign object and without foreign object cases (for the illustrated example system). Conversely, as shown in histogram plot 1700*c* of FIG. 17C corresponding to the L1 distance and histogram plot 1700*d* of FIG. 17D, the L1 distance can provide better margins.

The re-mapped state space (e.g., the f2, 1/(fQ), K state space described above) can also be used with the ecosystem scaling principles described above with reference to FIGS. 12-14. Such use of ecosystem scaling is described in greater detail below with reference to FIGS. 18A-18C. For any one Tx-Rx pair, regardless of golden or generic, the Rx-only clusters 1805*a*-1805*f* will always be aligned in the transformed fQK space 1800*a*. For simplicity, the transformed observables can be renamed as x, y, and z. The linear equation aligning the Rx-only clusters 1805*a*-1805*f* can then be written as $$x = k_1 z + b_1 \tag{52}$$

$$y = k_2 z + b_2 \tag{53}$$

Similar to the ecosystem scaling described above, scaling coefficients can be computed for a generic Tx and Rx with respect to a golden (reference) Tx and Rx, with these scaling coefficients being applied to the parameters defining the fit line 1601*a*.

Figure 18A:
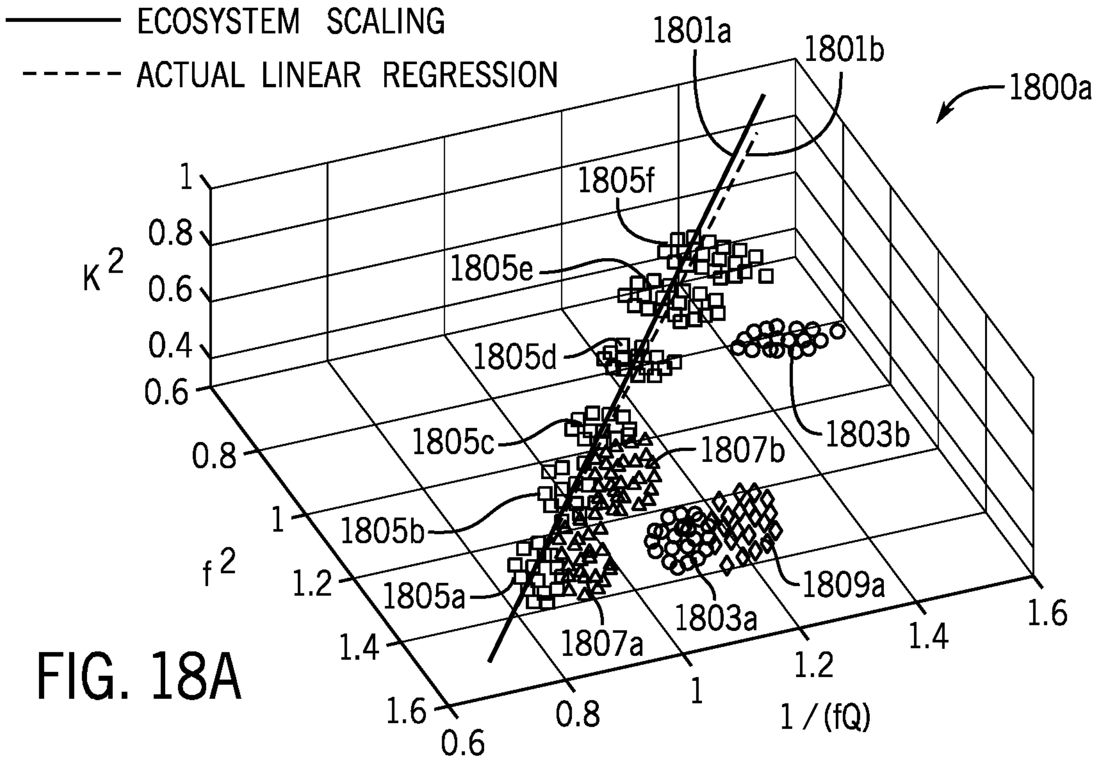
FIGS. 18A-18C illustrate ecosystem scaling for a multi-dimensional mated-Q foreign object detection system.
Figure 18B:
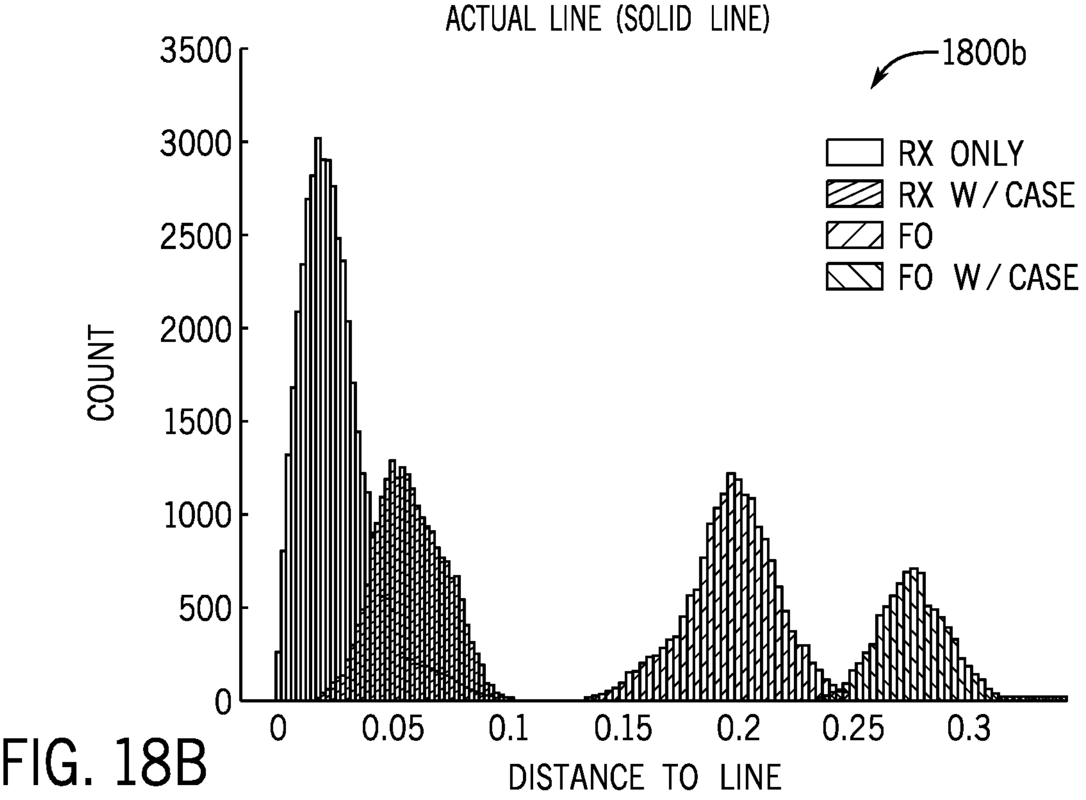
Figure 18C:
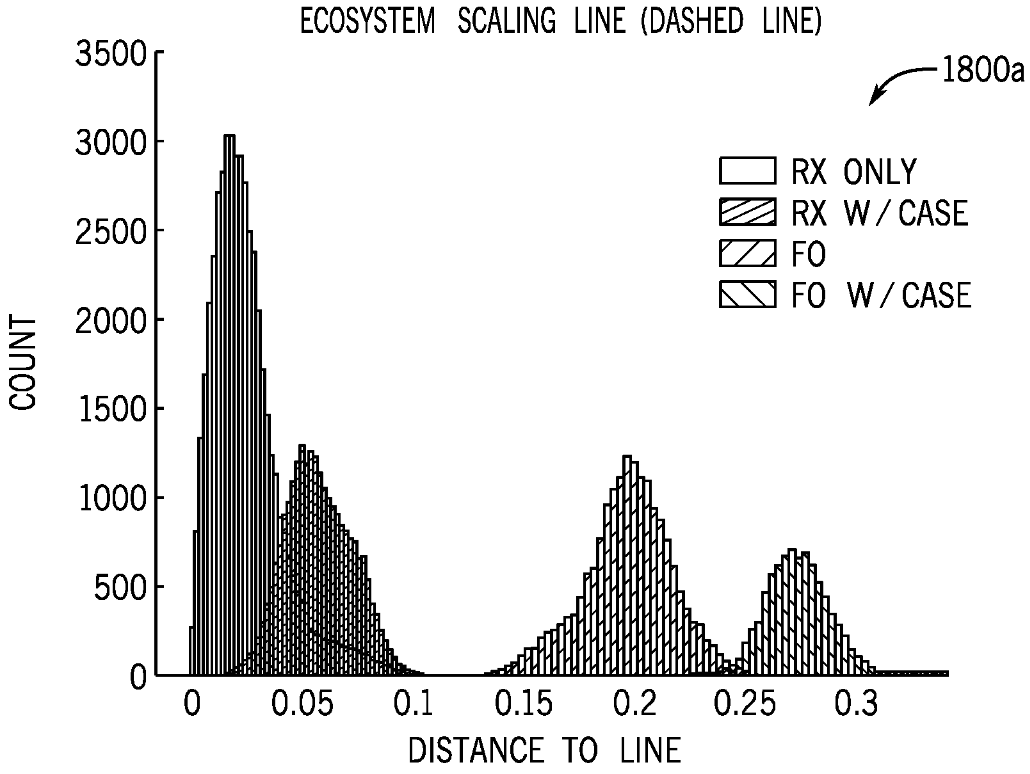

As shown in FIG. 18A-18C, an exemplary scaled fit line 1801*b* is very similar to the computed line given by the linear regression of the dataset (1801*a*). Therefore, as can be seen by comparison of FIGS. 18B-18C the histogram 1800*c* with respect to scaled fit line 1801*b* (FIG. 18A) is close to the histogram 1800*b* associated with the actual line 1801*a* (FIG. 18A). The accuracy of the scaled fit line means that a suitable level of foreign object detection accuracy can be expected when using the ecosystem scaling principles described below. In fact, in many cases, the threshold does not need to be changed.

In at least some applications, mated-Q measurements as described herein can not only provide information regarding the existence of a foreign object, but also where the foreign object is located. Such information could be used to estimate the potential foreign object losses for a given $P_{rect}$ and $V_{rect}$ values. Also, as described above, the foreign object position can influence the separation between the measured data points and the linear regression fit line.

Figure 19:
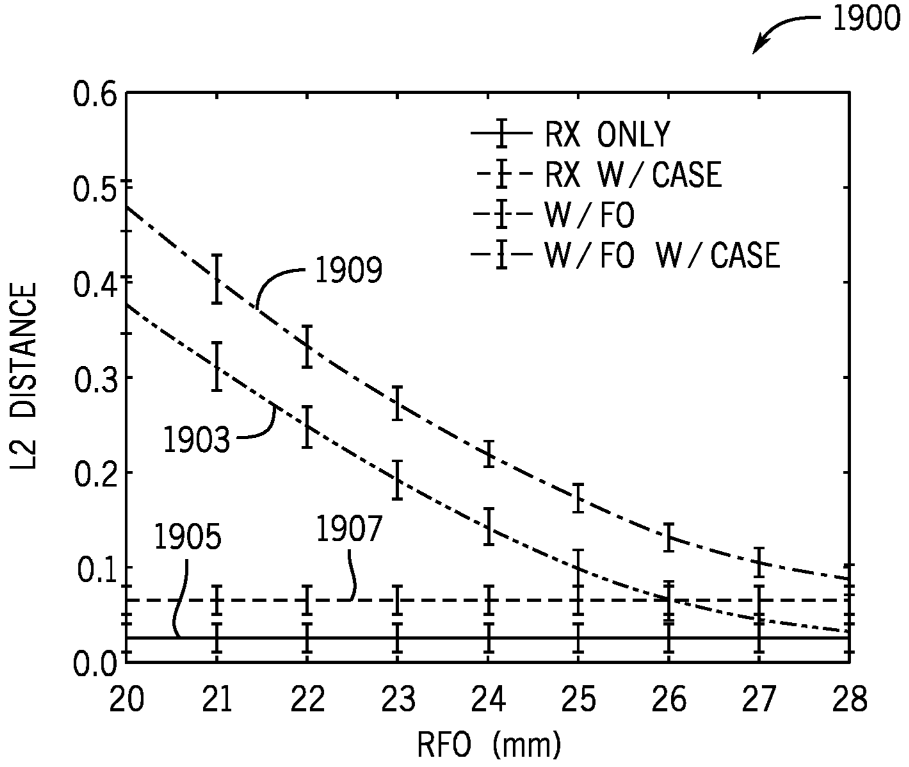
FIG. 19 illustrates determining the distance to a foreign object in a multi-dimensional mated-Q foreign object detection system.

As illustrated in plot 1900 of FIG. 19, the L2 distance (vertical axis) between the data point and the linear regression line decreases with the FO radius, i.e., the distance to the foreign object. This is true for each group of measurements, i.e., receiver-only measurements depicted in curve 1905, receiver plus case/cover measurements depicted in curve 1907, receiver and foreign object measurements depicted in curve 1903, and receiver plus case/cover plus foreign object measurements depicted in curve 1909. The error bars represent the standard deviation of each category. As the FO radius is directly related to the FO loss, the distance can be used to adjust the transmitter output power level accordingly. The table below lists exemplary estimated values of the FO radius at which the power dissipated in the foreign object will reach reaching 800 mW, which fall in the range of 20 mm to 30 mm. The first column of the table lists exemplary power levels (for each row). The second column lists estimated FO radius with Tx and Rx coupled with zero radial offset and a 2 mm z-axis/vertical offset, and the third column lists estimated FO radius with Tx and Rx coupled with a 2 mm radial offset and a 2.2 mm z-axis/vertical offset.

| $P_{rect}$ | FO radius (800 mW) Rx position: R = 0, z = 2 | FO radius (800 mW) Rx position: R = 2, z = 2.2 |
|---|---|---|
| 5 W | —(within approx. 20 mm) | —(within approx. 20 mm) |
| 15 W | Approx. 20.4 mm | Approx. 21.5 mm |
| 25 W | Approx. 22.1 mm | Approx. 23.6 mm |
| 50 W | Approx. 24.6 mm | Approx. 25.8 mm |

Figure 20:
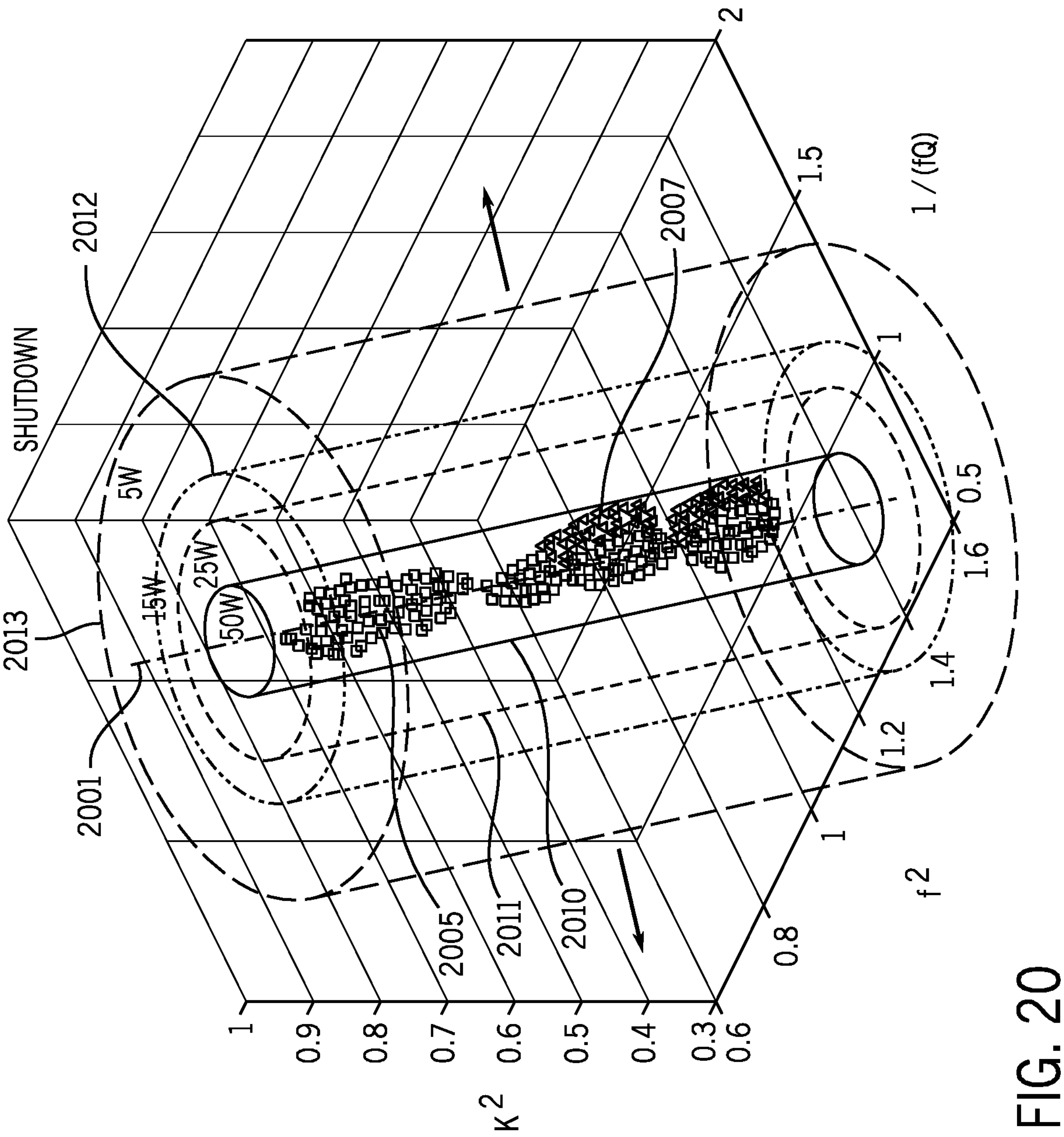
FIG. 20 illustrates limiting transmitted power based on foreign object distance in a multi-dimensional mated-Q foreign object detection system.

Combining the L2 distance vs RFO relationship and FO loss vs RFO relationship, an acceptable power level can be estimated as a function of the L2 distance. Therefore, instead of completely shutting down the power transfer when a foreign object is detected, a multi-level power adjustment strategy can be employed. One example of such a multi-level power level adaptation is illustrated in FIG. 20: (1) If the L2 distance is within 0.12, full power (e.g., a power level of 50 W) can be delivered; (2) if the L2 distance is between 0.12 and 0.22, the power should be adjusted to a first intermediate power level (e.g., 25 W); (3) if the distance is between 0.22 and 0.35, the power should be adjusted to a second intermediate power level (e.g., 15 W); (4) else if the L2 distance is higher than 0.35, the power should be adjusted to a low power level (e.g., 5 W). These power levels are exemplary and may be useful in various embodiments, but the particular L2 distances and power levels can be adapted as appropriate for a given application.

As noted, FIG. 20 depicts the various power levels by concentric cylinders centered on the fit line through the Rx-only data points 2005. Receiver plus case/cover data points 2007 are also depicted. The inner cylinder 2010 corresponds to the highest power level discussed above (e.g., 50 W). The next cylinder 2011 corresponds to the first intermediate power level (e.g., 25 W). The next cylinder 2012 corresponds to the second intermediate power level (e.g., 15 W). The outer cylinder 2013 corresponds to the low power level (e.g., 5 W). As described above, if the measured operating point has an L2 distance from linear regression fit line 2001 that exceeds the exemplary thresholds above, transmit power can be limited to the levels specified (and corresponding to the concentric cylinders).

In other embodiments, whether separately or combined with features of the embodiments described above, mated-Q measurement state spaces (including without limitation any of the magnetic parameters described above) can also be used to detect the presence of a case, cover, or other similar device enclosing or protecting the wireless power receiver and thus providing some z-axis separation between wireless power transmitter (PTx) and wireless power receiver (PRx). In this context, z-axis refers to a direction perpendicular to the plane of the respective coils. In such case, the measurements and determinations of the various circuit parameters may be made according to any suitable technique, including the techniques described above. The resulting data point groups can be plotted in a state space based on the measured parameters as described above.

Figure 21:
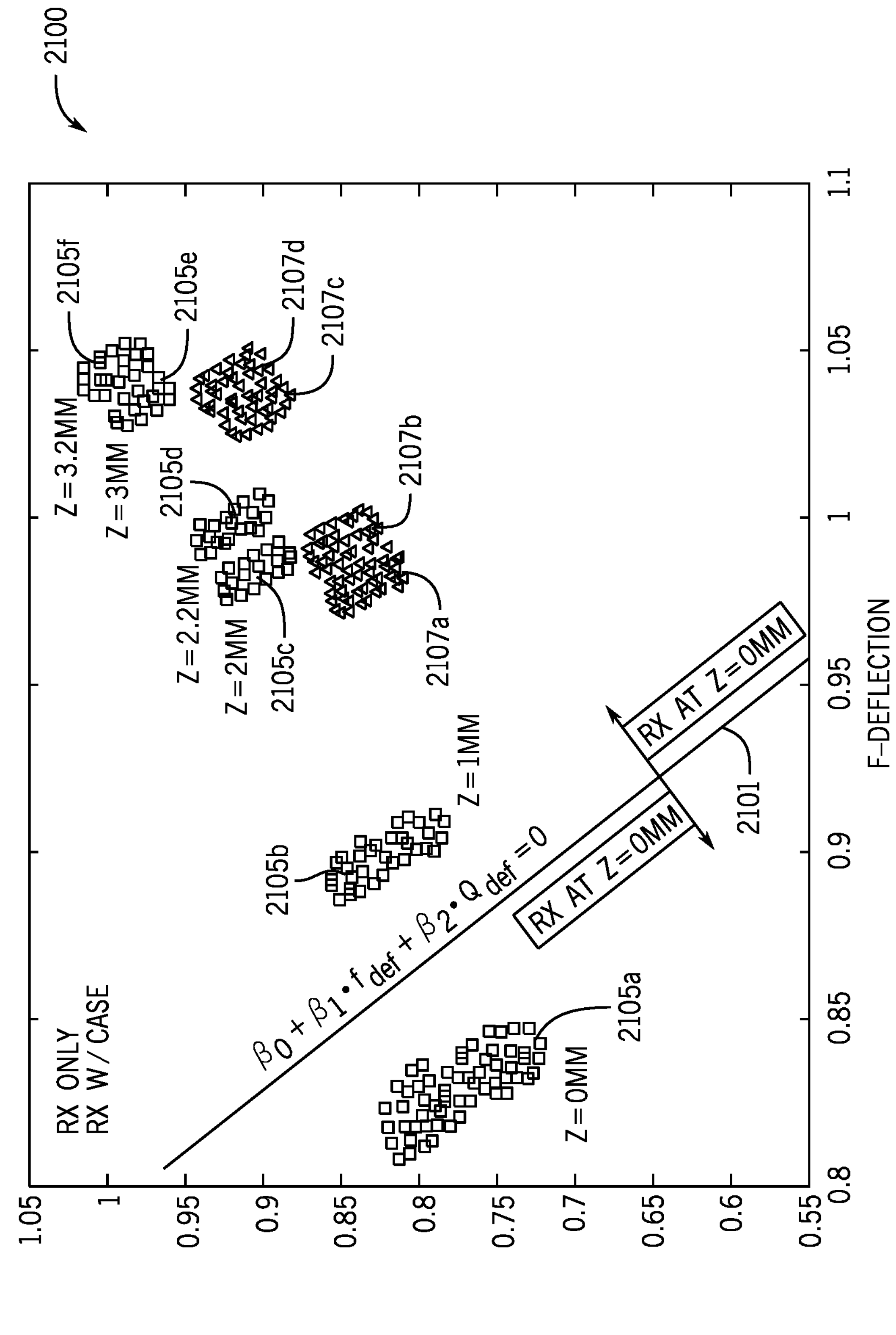
FIG. 21 illustrates principles relating to case detection using a mated-Q and resonant frequency measurement.

FIG. 21 illustrates an exemplary state space plot 2100. The illustrated state space is based on quality factor (Q) and resonant frequency (f) changes, plotted on the vertical and horizontal axes, respectively. However, any suitable state space using other combinations of parameters, such as the linearized parameters described above could also be used. FIG. 21 also illustrates data points 2105*a*-2105*f* corresponding to mated-Q measurements of a receiver device only. As noted, these mated-Q measurements can include any combination of the parameters discussed above, which can be directly measured and/or calculated by the processing system based on measured parameters. Each of the clusters 2105*a*-2105*f* corresponds to a different distance between the receiver and transmitter, in the illustrated example OmIR, 1 $m_{IR}$, 2 $m_{IR}$, 2.2 $m_{IR}$, 3 $m_{IR}$, and 3.2 $m_{IR}$, respectively. Also illustrated in FIG. 21 are data points 2107*a*-2107*d*, corresponding to a receiver with a case, or other cover or protective device interposed between wireless power transmitter (PTx) and wireless power receiver (PRx).

Similar to the techniques described above, a threshold can be calculated by the system allowing the system to detect z-axis/vertical separation between the wireless power transmitter and wireless power receiver, such as separation caused by the presence of a case, cover, or other similar object. However, such separation need not be caused by the presence of an additional object. In any case, detection of such z-axis/vertical separation may be used by the PTx device to reduce power to mitigate electromagnetic interference with other devices. The process can be broadly similar to that discussed above with respect to FIG. 10, but rather than detecting a foreign object, what is being detected is the presence of a case or cover and/or z-axis/vertical separation between PTx and PRx.

To achieve such detection, the threshold can be defined by a curve 2101. Curve 2101 may be a linear function of the form:

$$\beta_0 + \beta_1 f + A\beta_2 Q = 0 \tag{54}$$

where f and Q are the system resonant frequency and Q value and β0, β1, and β2 are coefficients that can be extracted by suitable statistical techniques. For example, in at least some embodiments, logistic regression can be used. In a more general sense, resonant frequency f and quality factor Q can each be replaced with respective functions of f and Q. Equation 54 thus becomes:

$$\beta_0 + \beta_1 x(f, Q) + \beta_2 y(f, Q) \tag{55}$$

where x(f,Q) is a first function of resonant frequency and quality factor and y(f,Q) is a second function of resonant frequency and quality factor. For example, x(f,Q) could be resonant frequency f and y(f,Q) could be quality factor Q, which would yield equation 54 as provided above. Alternatively, as one exemplary embodiment, x(f,Q) could become $f^2$ (resonant frequency squared) and y(f,Q) could become 1/(f·Q) (the inverse of resonant frequency times quality factor). As a result, the determination of whether a case or z-axis/vertical separation is present or not can be made by detecting a change in position of the first function-based and the second function-based measurements in a suitable state space.

It can be observed that the slope of threshold line 2101 is negative with respect to the slope of the foreign object detection line given in the examples above. Thus, when performing both foreign object detection and z-axis/vertical separation/case detection, separate thresholds may be used for each detection, although both detections (and their associated regression or other statistical analyses) can be based on the same measurements/data points. In the example illustrated with respect to FIG. 1, the determination is whether there is a z-axis/vertical separation between PRx and PTx, as opposed to whether there is a foreign object present as described above with reference to FIGS. 9-10. In other respects, the measurements, analyses, decisions, etc. that are performed by the processing systems of the respective devices can be broadly similar.

Described above are various features and embodiments relating to use of mated Q-factor and related magnetic property measurements for object detection in wireless power transfer systems. Such arrangements may be used in a variety of applications but may be particularly advantageous when used in conjunction with electronic devices such as mobile phones, tablet computers, laptop or notebook computers, and accessories, such as wireless headphones, styluses, etc. Additionally, although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A wireless power transmitter comprising:

wireless power transmitting circuitry having a wireless power transmitting coil that transmits wireless power signals; and control circuitry coupled to the wireless power transmitting circuitry that:

determines a present value of a first function of one or both of quality factor and resonant frequency of the wireless power transmitting coil and a present value of a second function of one or both of quality factor and resonant frequency of the wireless power transmitting coil while the wireless power transmitter is coupled to a wireless power receiver, wherein:

one of the first or second function of one or both of quality factor and resonant frequency is the inverse of resonant frequency deflection times quality factor deflection;

the resonant frequency deflection is a ratio of a value of the resonant frequency of the wireless power transmitting coil measured while the wireless power transmitter is coupled to the wireless power receiver to a calibration value of the resonant frequency; and the quality factor deflection is a ratio of a value of the quality factor of the wireless power transmitting coil measured while the wireless power transmitter is coupled to the wireless power receiver to a calibration value of the quality factor;

compares the determined present values of the first and second functions of one or both of quality factor and resonant frequency of the wireless power transmitting coil to a curve fit to corresponding baseline values in a magnetic state space having axes defined by the first and second functions of one or both of quality factor and resonant frequency; and determines that a foreign object is not present if the determined present values of the first and second functions of one or both of quality factor and resonant frequency are on a first side of the curve; or determines that a foreign object is present if the determined present values of the first and second functions of one or both of quality factor and resonant frequency are on a second side of the curve different from the first side of the curve; and wherein the control circuitry inhibits wireless power transfer or transfers power at a level below a maximum power level in response to determining that the foreign object is present.

2. The wireless power transmitter of claim 1 wherein the first and second functions of one or both of quality factor and resonant frequency are selected to provide a linear curve fit in the magnetic state space.

3. The wireless power transmitter of claim 1 wherein the control circuitry determines a present quality factor and resonant frequency of the wireless power transmitting coil by:

causing an inverter to provide one or more signal pulses to the wireless power transmitting coil;

using measurement circuitry to measure responses to the provided one or more signal pulses, wherein the responses include a ringing signal with a decay envelope characterized by a frequency of the ringing signal and the present quality factor; and determining the present quality factor and resonant frequency from the frequency of the ringing signal.

4. The wireless power transmitter of claim 1 wherein the control circuitry:

characterizes a foreign object as a moderate foreign object or strong foreign object based on a distance between the measured present values of the first and second functions of one or both of quality factor and resonant frequency of the wireless power transmitting coil and the curve fit to the corresponding baseline values; and inhibits wireless power transfer in response to determining that the foreign object is a strong foreign object; or allows wireless power transfer at a relatively lower power level in response to determining that the foreign object is a moderate foreign object.

5. The wireless power transmitter of claim 4 wherein the distance is an L1 distance.

6. The wireless power transmitter of claim 4 wherein the distance is an L2 distance.

7. The wireless power transmitter of claim 1 wherein the corresponding baseline values are measured during manufacture of the wireless power transmitter.

8. The wireless power transmitter of claim 1 wherein the corresponding baseline values are updated during in-field operation of the wireless power transmitter.

9. The wireless power transmitter of claim 1 wherein the control circuitry scales the baseline values using scaling factors based on a particular transmitter-receiver pairing.

10. The wireless power transmitter of claim 9 wherein the scaling factors are received from the wireless power receiver via the wireless power transmitting coil.

11. The wireless power transmitter of claim 1 wherein the first function of one or both of quality factor and resonant frequency is frequency deflection, and the second function of one or both of quality factor and resonant frequency is the inverse of resonant frequency deflection times quality factor deflection.

12. A method of operating a wireless power transmitter having wireless power transmitting circuitry that includes a wireless power transmitting coil configured to transmit wireless power signals and control circuitry coupled to the wireless power transmitting circuitry, the method being performed by the control circuitry and comprising:

determining a present value of a first function of one or both of quality factor and resonant frequency of the wireless power transmitting coil and a present value of a second function of one or both of quality factor and resonant frequency of the wireless power transmitting coil while the wireless power transmitter is coupled to a wireless power receiver;

wherein:

one of the first or second function of one or both of quality factor and resonant frequency is the inverse of resonant frequency deflection times quality factor deflection;

the resonant frequency deflection is a ratio of a value of the resonant frequency of the wireless power transmitting coil measured while the wireless power transmitter is coupled to the wireless power receiver to a calibration value of the resonant frequency; and the quality factor deflection is a ratio of a value of the quality factor of the wireless power transmitting coil measured while the wireless power transmitter is coupled to the wireless power receiver to a calibration value of the quality factor;

comparing the determined present values of the first and second functions of one or both of quality factor and resonant frequency of the wireless power transmitting coil to a curve fit to corresponding baseline values in a magnetic state space having axes defined by the first and second functions of one or both of quality factor and resonant frequency; and determining that a foreign object is not present if the determined present values of the first and second functions of one or both of quality factor and resonant frequency are on a first side of the curve; or determining that a foreign object is present if the determined present values of the first and second function of one or both of quality factor and resonant frequency are on a second side of the curve different from the first side of the curve; and inhibiting wireless power transfer or transferring power at a level below a maximum power level in response to determining that the foreign object is present.

13. The method of claim 12 wherein the first and second functions of one or both of quality factor and resonant frequency are selected to provide a linear curve fit in the magnetic state space.

14. The method of claim 12 further comprising determining a present quality factor and resonant frequency of the wireless power transmitting coil by:

causing an inverter to provide one or more signal pulses to the wireless power transmitting coil;

using measurement circuitry to measure responses to the provided one or more signal pulses, wherein the responses include a ringing signal with a decay envelope characterized by a frequency of the ringing signal and the present quality factor; and determining the present quality factor from the frequency of the ringing signal.

15. The method of claim 12 further comprising:

characterizing a foreign object as a moderate foreign object or strong foreign object based on a distance between the measured present values and the curve fit to the corresponding baseline values in the magnetic state space; and inhibiting wireless power transfer in response to determining that the foreign object is a strong foreign object; or allowing wireless power transfer at a relatively lower power level in response to determining that the foreign object is a moderate foreign object.

16. The method of claim 15 wherein the distance is an L1 distance.

17. The method of claim 15 wherein the distance is an L2 distance.

18. The method of claim 12 wherein the corresponding baseline values are measured during manufacture of the wireless power transmitter.

19. The method of claim 12 wherein the corresponding baseline values are updated during in field operation of the wireless power transmitter.

20. The method of claim 12 further comprising scaling the corresponding baseline values using scaling factors based on a particular transmitter-receiver pairing.

21. The method of claim 20 wherein the scaling factors are received from the wireless power receiver via the wireless power transmitting coil.

22. The method of claim 12 wherein the first function of one or both of quality factor and resonant frequency is frequency deflection, and the second function of one or both of quality factor and resonant frequency is the inverse of resonant frequency deflection times quality factor deflection.

23. A wireless power transmitter comprising wireless power transmitting circuitry having a wireless power transmitting coil that transmits wireless power signals and control circuitry coupled to the wireless power transmitting circuitry configured to detect a foreign object by:

determining a point in a magnetic state space, wherein the magnetic state space is defined by a first axis corresponding to a first function of one or both of quality factor and resonant frequency and a second axis corresponding to a second function of one or both of quality factor and resonant frequency, wherein the control circuitry determines the point in the magnetic state space by:

calculating a first coordinate of the point in the magnetic state space as a present value of the first function of one or both of quality factor and resonant frequency of the wireless power transmitting coil with the wireless power transmitter coupled to a wireless power receiver;

calculating a second coordinate of the point in the magnetic state space as a present value of the second function of one or both of quality factor and resonant frequency of the wireless power transmitting coil with the wireless power transmitter coupled to the wireless power receiver;

wherein:

one of the first or second function of one or both of quality factor and resonant frequency is the inverse of resonant frequency deflection times quality factor deflection;

the resonant frequency deflection is a ratio of a value of the resonant frequency of the wireless power transmitting coil measured while the wireless power transmitter is coupled to the wireless power receiver to a calibration value of the resonant frequency; and the quality factor deflection is a ratio of a value of the quality factor of the wireless power transmitting coil measured while the wireless power transmitter is coupled to the wireless power receiver to a calibration value of the quality factor;

determining that a foreign object is present by comparing the determined point to a curve in the magnetic state space that has been fit to corresponding baseline values of the first and second functions of one or both of quality factor and resonant frequency of the wireless power transmitting coil, wherein:

the control circuitry determines that a foreign object is not present responsive to the determined point being on a first side of the curve; and the control circuitry determines that a foreign object is present responsive to the determined point being on a second side of the curve different from the first side of the curve.

* * * * *